(12) United States Patent
Yamashita

(10) Patent No.: US 12,017,585 B2
(45) Date of Patent: Jun. 25, 2024

(54) ABNORMALITY DETECTION DEVICE, ABNORMALITY DETECTION METHOD, PROGRAM, AND INFORMATION PROCESSING SYSTEM

(71) Applicant: Sony Semiconductor Solutions Corporation, Kanagawa (JP)

(72) Inventor: Yutaro Yamashita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 191 days.

(21) Appl. No.: 17/622,173

(22) PCT Filed: Jul. 8, 2020

(86) PCT No.: PCT/JP2020/026645
§ 371 (c)(1),
(2) Date: Dec. 22, 2021

(87) PCT Pub. No.: WO2021/006287
PCT Pub. Date: Jan. 14, 2021

(65) Prior Publication Data
US 2022/0274526 A1  Sep. 1, 2022

(30) Foreign Application Priority Data
Jul. 10, 2019 (JP) .................. 2019-128189

(51) Int. Cl.
*B60R 1/00* (2022.01)
*G06Q 40/08* (2012.01)
(Continued)

(52) U.S. Cl.
CPC .............. *B60R 1/00* (2013.01); *G06Q 40/08* (2013.01); *H04N 23/55* (2023.01); *H04N 23/56* (2023.01); *H04N 23/67* (2023.01); *H04N 25/61* (2023.01)

(58) Field of Classification Search
CPC .......... B60R 1/00; G06Q 40/08; H04N 23/55; H04N 23/56; H04N 23/67; H04N 25/61;
(Continued)

(56) References Cited

U.S. PATENT DOCUMENTS

| 2008/0074507 A1* | 3/2008 | Ohara | .................. H04N 17/002 348/222.1 |
| 2009/0187379 A1* | 7/2009 | Itai | ...................... G03F 7/70525 702/179 |

(Continued)

FOREIGN PATENT DOCUMENTS

| EP | 3 564 747 A1 | 11/2019 |
| JP | 2004085673 A | 3/2004 |

(Continued)

OTHER PUBLICATIONS

International Search Report and English translation thereof dated Sep. 29, 2020 for International Application No. PCT/JP2020/026645.

*Primary Examiner* — Nasim N Nirjhar
(74) *Attorney, Agent, or Firm* — Wolf, Greenfield & Sacks, P.C.

(57) ABSTRACT

The imaging unit 500 captures an image using a lens having an effective image circle smaller than the imaging surface of an image sensor. A vignetting amount calculation unit 2212 of a detection unit 221 individually calculates, for four corners, a region size of a vignetting region generated in the captured image acquired by the imaging unit 500, for example. A determination unit 2214 detects a change in the region size calculated at the time of focus abnormality detection processing with respect to the region size calculated at the reference time, and determines that a focus abnormality is detected when the change in the region size (Continued)

exceeds a threshold at any of the four corners. This enables accurate detection of focus abnormality.

13 Claims, 21 Drawing Sheets

(51) Int. Cl.
*H04N 23/55* (2023.01)
*H04N 23/56* (2023.01)
*H04N 23/67* (2023.01)
*H04N 25/61* (2023.01)

(58) Field of Classification Search
CPC .... H04N 17/002; H04N 17/004; G02B 27/32; G03B 43/00; G03B 17/02
See application file for complete search history.

(56) References Cited

U.S. PATENT DOCUMENTS

2019/0369635 A1* 12/2019 Kobayashi .......... B60W 50/023
2020/0106948 A1*  4/2020 Li ......................... G03B 13/36

FOREIGN PATENT DOCUMENTS

| JP | 2012234152 A | 11/2012 |
| JP | 2013-038620 A | 2/2013 |
| JP | 2014-006243 A | 1/2014 |
| JP | 2018122753 A | 8/2018 |
| KR | 20130037971 A | 4/2013 |
| WO | WO 2018/123639 A1 | 7/2018 |

* cited by examiner

FIG. 9
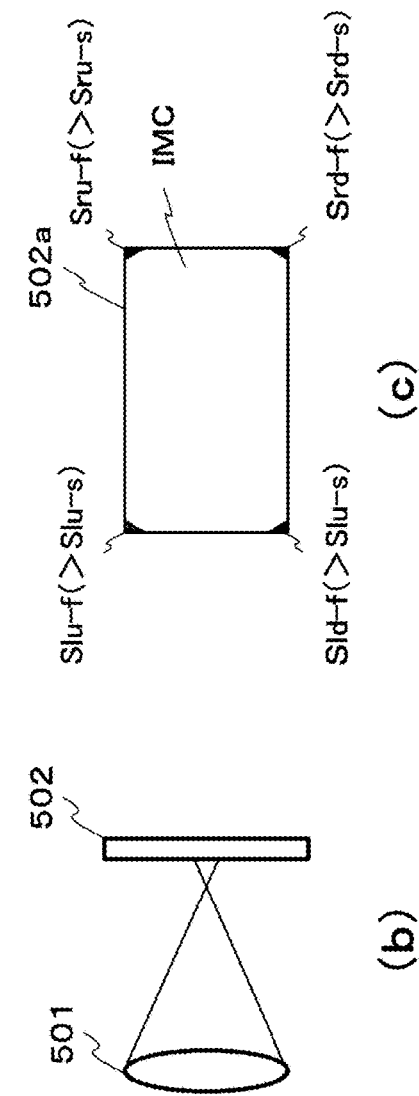
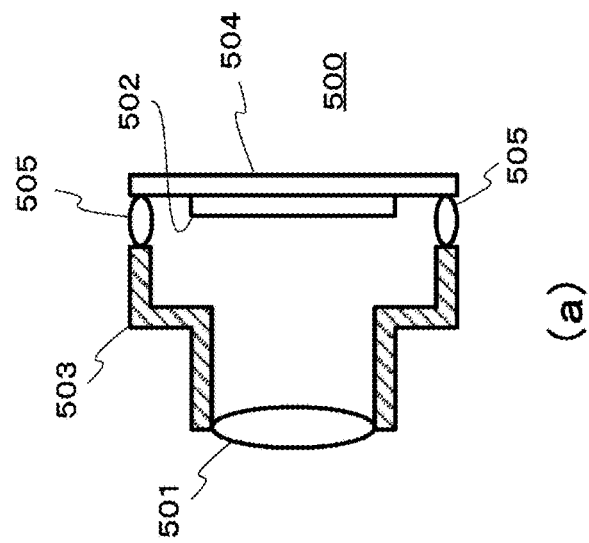

FIG. 10
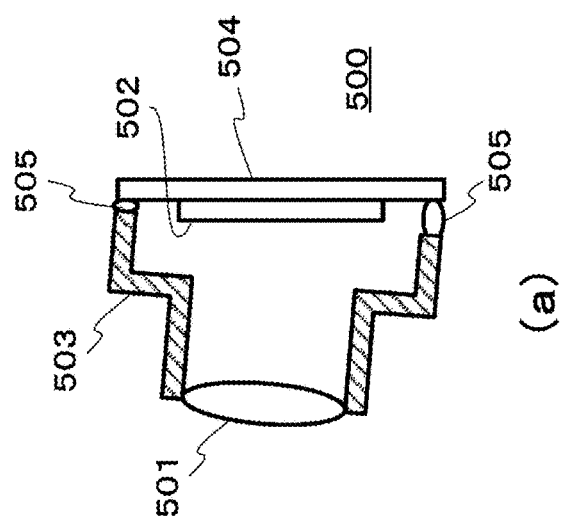
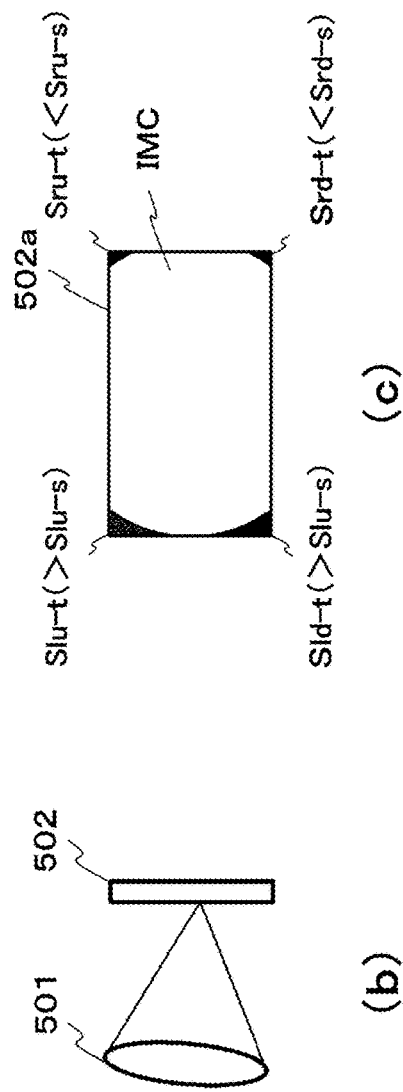

FIG. 12
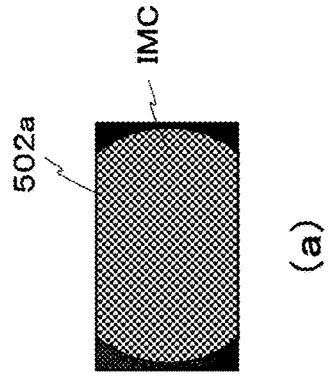
(a)
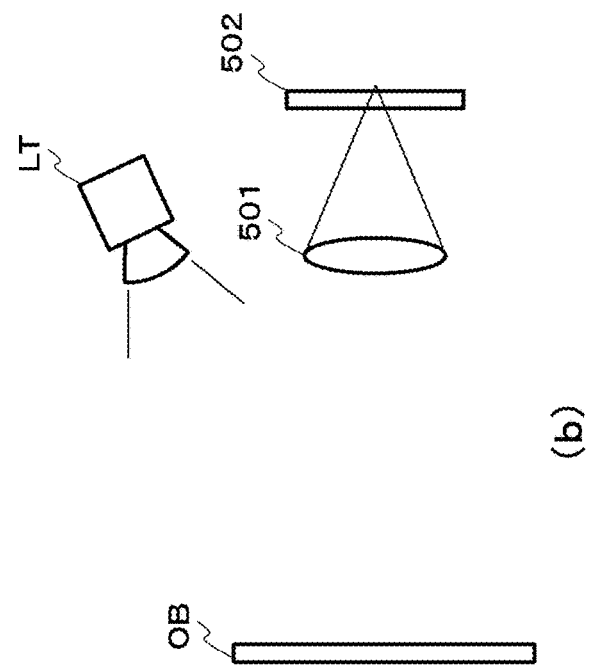
(b)
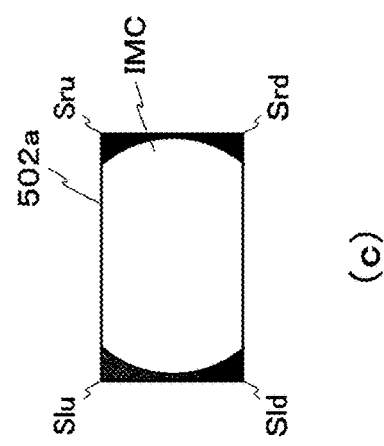
(c)

ABNORMALITY DETECTION DEVICE, ABNORMALITY DETECTION METHOD, PROGRAM, AND INFORMATION PROCESSING SYSTEM

CROSS-REFERENCE TO RELATED APPLICATIONS

The present application claims the benefit under 35 U.S.C. § 371 as a U.S. National Stage Entry of International Application No. PCT/JP2020/026645, filed in the Japanese Patent Office as a Receiving Office on Jul. 8, 2020, which claims priority to Japanese Patent Application Number JP2019-128189, filed in the Japanese Patent Office on Jul. 10, 2019, each of which applications is hereby incorporated by reference in its entirety.

TECHNICAL FIELD

This technology relates to an abnormality detection device, an abnormality detection method, a program, and an information processing system, and enables accurate detection of focus abnormality.

BACKGROUND ART

Conventionally, an information processing system using a movable body such as an automobile has been mounted on a movable body to capture an image of the front and other directions of the movable body and process and analyze the obtained captured image to recognize an obstacle, for example. Such a system cannot correctly recognize an obstacle, for example, unless the imaging device operates normally. For this reason, in Patent Document 1, for example, parallax image data is generated from stereo image data acquired by an imaging device, and whether or not the imaging device is abnormal is determined on the basis of the parallax image data.

CITATION LIST

Patent Document

Patent Document 1: Japanese Patent Application Laid-Open No. 2014-006243

SUMMARY OF THE INVENTION

Problems to be Solved by the Invention

Incidentally, in the case where it is determined whether or not there is an abnormality on the basis of parallax image data, since the imaging device needs to generate stereo image data, an imaging device that generates image data of one viewpoint cannot detect the abnormality.

In view of the foregoing, an object of this technology is to provide an abnormality detection device, an abnormality detection method, a program, and an information processing system that enable accurate detection of focus abnormality.

Solutions to Problem

A first aspect of the present technology is
an abnormality detection device including:
a detection unit that uses an image captured by an image sensor using a lens having an effective image circle smaller than an imaging surface of the image sensor to detect focus abnormality on the basis of a change in a vignetting region of the captured image.

In this technology, a vignetting region is detected from an image captured by an imaging unit using a lens in which an effective image circle is smaller than an imaging surface of an image sensor, and focus abnormality is detected on the basis of a change in the vignetting region at the time of focus abnormality detection processing with respect to the vignetting region at a reference time. For example, the detection unit detects a change in the region size of the vignetting region for each of four corners of the captured image, and determines that the focus abnormality is detected in a case where the change in the region size exceeds the vignetting determination threshold at any of the four corners. Additionally, the detection unit detects the sharpness of the captured image, and determines that the focus abnormality is detected in a case where the detected sharpness is lower than a preset sharpness threshold. Note that the detector may determine the cause of the focus abnormality on the basis of the change in the vignetting region when the focus abnormality is detected.

Additionally, the abnormality detection device may further include a light source unit that illuminates a subject imaged by the image sensor, and may further include a motion controller that controls the motion of the vehicle on which the image sensor is mounted. The motion controller may stop a driving support function of the vehicle when the detection unit detects the focus abnormality, and in a case where the motion controller executes an autonomous driving control function of the vehicle on which the image sensor is mounted, the detection unit performs the focus abnormality detection processing before the motion controller starts the autonomous driving of the vehicle, and the motion controller stops the autonomous driving control function and switches to manual driving when the detection unit detects the focus abnormality.

A second aspect of the present technology is
an abnormality detection method including
using an image captured by an image sensor using a lens having an effective image circle smaller than an imaging surface of the image sensor to detect focus abnormality on the basis of a change in a vignetting region of the captured image.

A third aspect of the present technology is
a program for causing a computer to execute focus abnormality detection, the program including the procedures of
capturing an image by an image sensor using a lens having an effective image circle smaller than an imaging surface of the image sensor, and
detecting focus abnormality on the basis of a vignetting region of the captured image.

Note that the program of the present technology is a program that can be provided by a storage medium provided in a computer-readable format to a general-purpose computer that can execute various program codes, a communication medium, a storage medium such as an optical disk, a magnetic disk, or a semiconductor memory, or a program that can be provided by a communication medium such as a network. By providing such a program in a computer-readable format, processing corresponding to the program is realized on the computer.

A fourth aspect of the present technology is
an information processing system including
an abnormality detection device and
a server using a detection result of the abnormality detection device, in which the abnormality detection device includes
a detection unit that uses an image captured by an image sensor using a lens having an effective image circle smaller than an imaging surface of the image sensor to detect focus abnormality on the basis of a change in a vignetting region of the captured image, and
the server includes
a notification information generation unit that generates user notification information using a focus abnormality detection result of the detection unit.

BRIEF DESCRIPTION OF DRAWINGS

FIG. 9 is a diagram illustrating another case where the imaging unit changes from a state at the reference time.
FIG. 10 is a diagram illustrating a case where the optical axis of a lens is shifted in the imaging unit.
FIG. 12 is a diagram illustrating a case where no illumination light is used and a case where illumination light is used.

MODE FOR CARRYING OUT THE INVENTION

Hereinafter, a mode for carrying out the present technology will be described. Note that the description will be given in the following order.

Figure 1:
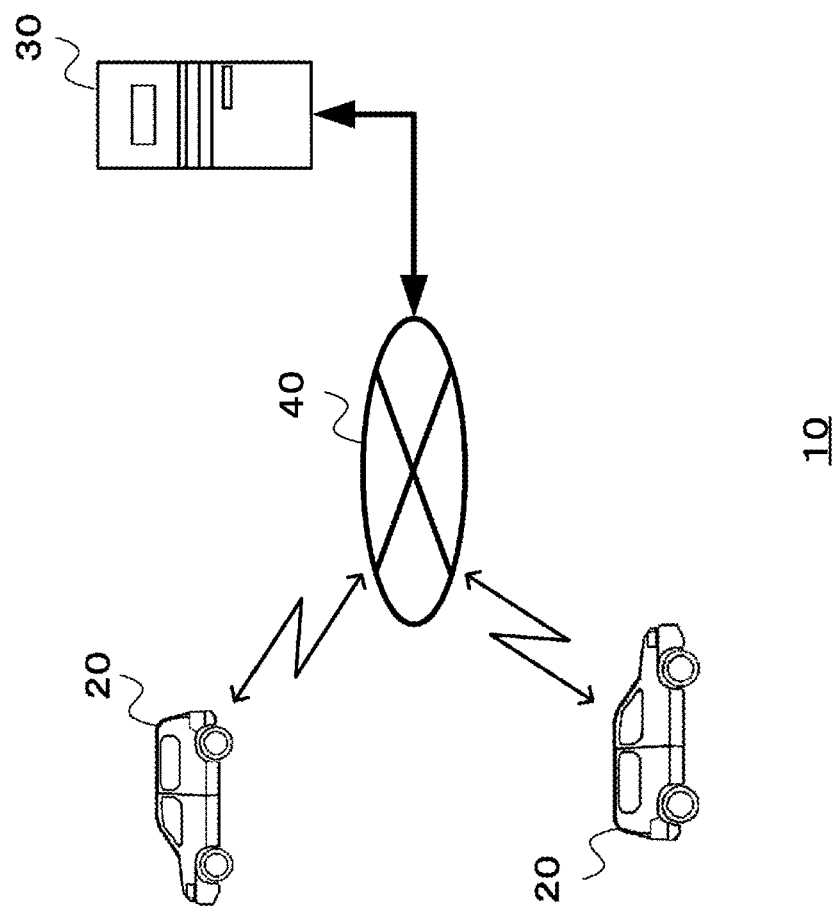
FIG. 1 is a diagram illustrating a configuration of an information processing system using a movable body.

1. Embodiment
1-1. Configuration of vehicle
1-2. Operation of vehicle
1-3. Modification
1-4. Configuration and operation of server
1-5. Other configuration and operation of server
2. Application example 1. Embodiment FIG. 1 illustrates a configuration of an information processing system using a movable body to which the present technology can be applied. In an information processing system 10, one or multiple movable bodies such as vehicles 20 are provided, and each vehicle 20 and a server 30 are connected through a network 40. An abnormality detection device of the present technology is provided in the vehicle 20. The abnormality detection device uses an image captured by an image sensor using a lens having an effective image circle smaller than an imaging surface of the image sensor to detect focus abnormality on the basis of a change in a vignetting region of the captured image.

Additionally, the server 30 generates user notification information using the focus abnormality detection result acquired from the vehicle 20.

<1-1. Configuration of Vehicle>

Next, a configuration of the vehicle 20 will be described. The vehicle 20 includes an imaging unit, and executes a driving support function or an autonomous driving control function using an image captured by the imaging unit. Additionally, the vehicle 20 detects focus abnormality in the imaging unit and notifies the occupant of the vehicle, a driving control unit, and the like of the focus abnormality detection result. Additionally, the vehicle 20 notifies the server 30 of log information including at least the focus abnormality detection result or identification information of the vehicle and the like. The server 30 generates user notification information on the basis of log information notified from the vehicle 20, and provides a service for notifying the administrator or the like of the vehicle 20, for example.

Figure 2:
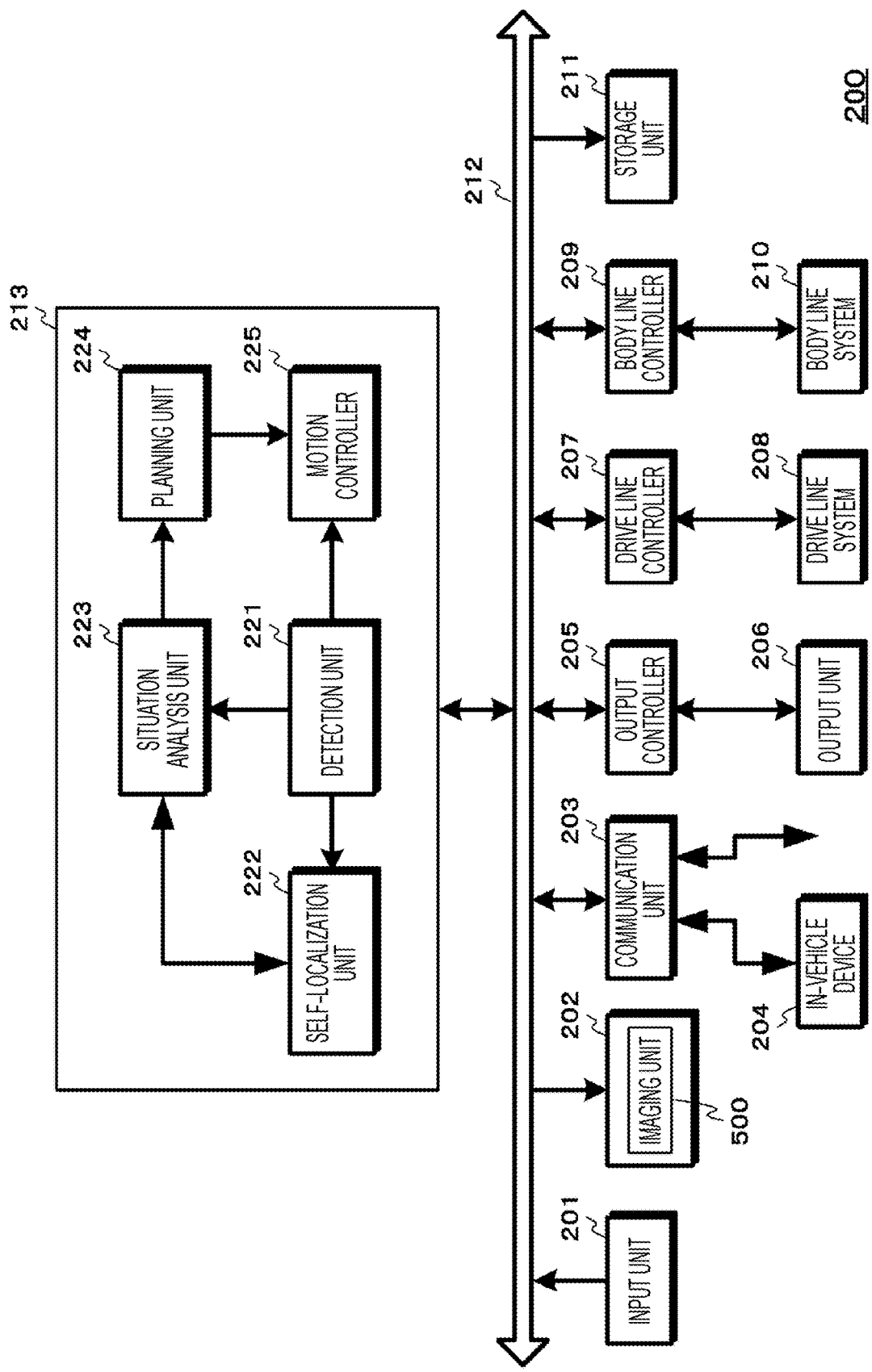
FIG. 2 is a diagram illustrating a schematic functional configuration of a control system.

FIG. 2 is a diagram illustrating a schematic functional configuration of a control system in a vehicle. A control system 200 of the vehicle 20 includes an input unit 201, a data acquisition unit 202, a communication unit 203, an in-vehicle device 204, an output controller 205, an output unit 206, a drive line controller 207, a drive line system 208, a body line controller 209, a body line system 210, a storage unit 211, and an autonomous driving controller 213. The input unit 201, the data acquisition unit 202, the communication unit 203, the output controller 205, the drive line controller 207, the body line controller 209, the storage unit 211, and the autonomous driving controller 213 are connected to one another through a communication network 212. Note that units of the control system 200 may be connected to one another directly without interposing the communication network 212.

Note that hereinafter, in a case where each unit of the control system 200 communicates through the communication network 212, the description of the communication network 212 will be omitted. For example, in a case where the input unit 201 and the autonomous driving controller 213 communicate with each other through the communication network 212, it is simply described that the input unit 201 and the autonomous driving controller 213 communicate with each other.

The input unit 201 includes devices used by an occupant to input various data, instructions, and the like. For example, the input unit 201 includes an operation device such as a touch panel, a button, and a switch, and an operation device or the like that enables input by a method other than manual operation such as voice and gesture. Additionally, for example, the input unit 201 may be a remote control device using infrared rays, radio waves, or the like, or an external connection device corresponding to the operation of the control system 200. The input unit 201 generates an input signal on the basis of data and instructions input by an occupant, for example, and supplies the input signal to units of the control system 200.

The data acquisition unit 202 includes various sensors that acquire data used for processing of the control system 200, and supplies the acquired data to units of the control system 200. The data acquisition unit 202 includes an imaging unit 500 for grasping the situation outside the vehicle. The imaging unit 500 captures an image using a lens having an effective image circle smaller than the imaging surface of an image sensor. Additionally, in order to detect the situation outside the vehicle, the data acquisition unit 202 may include an environment sensor for detecting weather and the like, and an ambient information detection sensor for detecting objects around the vehicle, for example. The environment sensor includes, for example, a raindrop sensor, a fog sensor, a sunshine sensor, a snow sensor, and the like. The ambient information detection sensor includes, for example, an ultrasonic sensor, a radar, light detection and ranging, laser imaging detection and ranging (LiDAR), a sonar, and the like.

Additionally, the data acquisition unit 202 includes a sensor or the like for detecting a state of the vehicle, for example. For example, the data acquisition unit 202 includes a gyro sensor, an acceleration sensor, an inertial measurement unit (IMU), and a sensor or the like for detecting an accelerator pedal operation amount, a brake pedal operation amount, a steering wheel steering angle, the number of revolutions of the engine, the number of revolutions of the motor, the rotation speed of the wheels, or the like. Moreover, the data acquisition unit 202 includes various sensors for detecting the current location of the vehicle. For example, the data acquisition unit 202 includes a global navigation satellite system (GNSS) receiver or the like that receives GNSS signals from a GNSS satellite.

Additionally, the data acquisition unit 202 may include various sensors for detecting information on the inside of the vehicle. For example, the data acquisition unit 202 includes an imaging device that captures images of a driver, a biometric sensor that detects biometric information of the driver, and a microphone or the like that collects sound in the vehicle interior. For example, the biometric sensor is provided on a seat surface, a steering wheel, or the like, and detects biometric information of an occupant sitting in the seat or a driver who grips the steering wheel.

The communication unit 203 communicates with the in-vehicle device 204 and various devices outside the vehicle such as the server 30 to transmit data supplied from units of the control system 200 and supply received data to units of the control system 200, for example. Note that the communication protocol supported by the communication unit 203 is not particularly limited, and the communication unit 203 can support multiple types of communication protocols.

For example, the communication unit 203 performs wireless communication with the in-vehicle device 204 by wireless LAN, Bluetooth (registered trademark), near field communication (NFC), wireless USB (WUSB), or the like. Additionally, for example, the communication unit 203 performs wired communication with the in-vehicle device 204 by universal serial bus (USB), high-definition multimedia interface (HDMI) (registered trademark), mobile high-definition link (MHL), or the like through a connection terminal (and, if necessary, a cable) not shown.

Additionally, the communication unit 203 communicates with the server 30 through a network (e.g., Internet, cloud network, or company-specific network). Moreover, the communication unit 203 may be configured to perform communication with a terminal, a wireless station, or the like in the vicinity of the vehicle, vehicle-to-vehicle communication, road-to-vehicle (vehicle to infrastructure) communication, vehicle-to-home communication, and pedestrian-to-vehicle communication, for example.

The in-vehicle device 204 includes, for example, a device possessed by an occupant, an information device provided in the vehicle, a navigation device that searches for a route, and the like.

The output controller 205 controls output of various kinds of information to an occupant of the vehicle or to the outside of the vehicle. For example, the output controller 205 generates an output signal including at least one of visual information (e.g., image data) or auditory information (e.g., voice data), and supplies the output signal to the output unit 206 to control output of visual information and auditory information from the output unit 206. For example, the output controller 205 supplies an output signal including a bird's-eye view image, a panoramic image, or the like to the output unit 206. Additionally, the output controller 205 supplies, to the output unit 206, an output signal including voice data or the like including a warning sound, a warning message, or the like for danger such as collision, contact, entry into a dangerous zone, or the like.

The output unit 206 includes a device capable of outputting visual information or auditory information to an occupant of the vehicle or to the outside of the vehicle. For example, the output unit 206 includes a display device, an instrument panel, an audio speaker, headphones, a wearable device, a projector, a lamp, and the like. The display device included in the output unit 206 may be, in addition to a device having a normal display, for example, a device that displays visual information in the visual field of the driver, such as a head-up display, a transmissive display, or a device having an augmented reality (AR) display function.

The drive line controller 207 controls the drive line system 208 by generating various control signals and supplying them to the drive line system 208. Additionally, the drive line controller 207 supplies a control signal to units other than the drive line system 208 as necessary to notify the units of the control state of the drive line system 208, for example.

The drive line system 208 includes various devices related to the drive line of the vehicle. For example, the drive line system 208 includes a drive force generation device for generating a drive force of an internal combustion engine, a drive motor, or the like, a drive force transmission mechanism for transmitting the drive force to the wheels, a steering mechanism that adjusts the steering angle, a braking device that generates a braking force, an antilock brake system (ABS), electronic stability control (ESC), an electric power steering device, and the like.

The body line controller 209 controls the body line system 210 by generating various control signals and supplying them to the body line system 210. Additionally, the body line controller 209 supplies a control signal to units other than the body line system 210 as necessary to notify the units of the control state of the body line system 210, for example.

The body line system 210 includes various body-line devices mounted on the vehicle body. For example, the body line system 210 includes a keyless entry system, a smart key system, a power window device, power seats, a steering wheel, an air conditioner, various lamps (e.g., headlights, backlights, brake lights, blinkers, fog lights, and the like), and the like.

The storage unit 211 includes, for example, a magnetic storage device such as a read only memory (ROM), a random access memory (RAM), a hard disc drive (HDD), a semiconductor storage device, an optical storage device, a magneto-optical storage device, and the like. The storage unit 211 stores various programs, data, and the like used by units of the control system 200. For example, the storage unit 211 stores map data such as a three-dimensional high-precision map like a dynamic map, a global map having a lower precision than the high-precision map and covering a wide area, and a local map or the like including information around the vehicle.

Additionally, the storage unit 211 stores log information of the vehicle 20 in which the control system 200 is provided. Log information includes identification information of the vehicle 20 (e.g., chassis number or vehicle number, initial registration year (such as year in which first user starts use)), identification information of imaging unit 500 provided in data acquisition unit 202 (e.g., part number or serial number), a use start year of the imaging unit 500, a result of focus abnormality detection by the imaging unit 500, a time and a position at which an abnormality is detected, a captured image at the time of abnormality detection, and the like. Additionally, log information may include a cause of the focus abnormality. Additionally, log information may include information of an administrator or the like of the vehicle 20, a determination result of the cause of focus abnormality, and the like. Moreover, log information may include environmental information outside and inside the vehicle (e.g., vehicle interior temperature, vehicle exterior temperature, or weather at use time of vehicle 20), usage status information of the vehicle (travel distance, use start time, use end time, and the like), failure status information of each unit (e.g., failure occurrence status or repair status), and the like. Log information may include a threshold (sharpness threshold) used for determining sharpness of an image captured by the imaging unit 500 and a threshold (vignetting determination threshold) used for determining a change in vignetting. Note that log information may include detected information, a determination result, or the like of a detection unit 221 to be described later, and information calculated using such information. Additionally, log information may include a history of notifications of abnormal states to the driver or the occupant of the vehicle, and may include accident information (e.g., type of accident or damage situation).

The autonomous driving controller 213 executes an autonomous driving control function, a driving support function, or the like. The autonomous driving controller 213 performs, for example, coordinated control aimed to achieve functions of an advanced driver assistance system (ADAS) including collision avoidance or shock mitigation of the vehicle, follow-up traveling based on an inter-vehicle distance, vehicle speed maintenance traveling, warning for collision of the vehicle, warning for lane departure of the vehicle, or the like, and coordinated control aimed to perform autonomous driving in which the vehicle autonomously travels without depending on the driver's operation, for example. Additionally, the autonomous driving controller 213 may execute a driving support function instead of the autonomous driving control function. The autonomous driving controller 213 includes the detection unit 221, a self-localization unit 222, a situation analysis unit 223, a planning unit 224, and a motion controller 225.

When executing the autonomous driving function control and the driving support function, the autonomous driving controller 213 determines whether to execute the autonomous driving function control and the driving support function on the basis of autonomous driving level control information. In a case where the above functions may be executed, the autonomous driving controller 213 executes these functions. In a case where there is a function that should not be executed, the autonomous driving controller 213 does not execute the function that should not be executed. Autonomous driving level control information may be set in advance, or may be received from a server or the like outside the vehicle.

The detection unit 221 detects various kinds of information necessary for controlling autonomous driving. The detection unit 221 performs detection processing of information on the outside of the vehicle and of the surrounding environment on the basis of data or signals from units of the control system 200. The detection unit 221 performs, as detection processing of information on the outside of the vehicle, recognition processing, tracking processing, and distance detection processing regarding another vehicle, a person, an obstacle, a structure, a road, a traffic light, a traffic sign, a road marking, and the like, and performs, as detection processing of the surrounding environment, detection processing of weather, temperature, humidity, brightness, a road surface state, and the like.

Additionally, the detection unit 221 performs inside information detection processing on the basis of data or signals from units of the control system 200. The detection unit 221 performs, as inside information detection processing, authentication processing and recognition processing of a driver, driver state detection processing, occupant detection processing, in-vehicle environment detection processing, and the like. The detection unit 221 detects the physical condition, the wakefulness level, the concentration level, the fatigue level, the line-of-sight direction, and the like in the driver state detection processing, and detects the temperature, the humidity, the brightness, the odor, and the like in the in-vehicle environment detection processing.

Additionally, the detection unit 221 performs vehicle state detection processing on the basis of data or signals from units of the control system 200. As vehicle state detection processing, the detection unit 221 detects speed, acceleration, steering angle, presence/absence and content of abnormality, state of driving operation, position and inclination of power seat, state of door lock, state of other in-vehicle devices, and the like.

Moreover, the detection unit 221 performs focus abnormality detection processing on the imaging unit 500 provided in the data acquisition unit 202. Note that details of focus abnormality detection processing will be described later.

The detection unit 221 supplies data indicating the focus abnormality detection result to the self-localization unit 222, the situation analysis unit 223, the motion controller 225, and the like. Additionally, the detection unit 221 causes the storage unit 211 to store information regarding the focus abnormality detection result and detection results obtained by performing various detection processing on the basis of data or signals from each unit of the control system 200.

The self-localization unit 222 performs estimation processing of the position, orientation, and the like of the vehicle on the basis of data or signals from the detection unit 221, the situation analysis unit 223 described later, and the like, and supplies data indicating the estimation result to the situation analysis unit 223.

The situation analysis unit 223 performs analysis processing of the vehicle and the surrounding situation. The situation analysis unit 223 uses data or signals from units of the control system 200 such as the detection unit 221 and the self-localization unit 222 as necessary to perform analysis processing of various maps stored in the storage unit 211, and constructs a map including information necessary for autonomous driving processing.

On the basis of the constructed map and data or signals from each unit of the control system 200 such as the detection unit 221 and the self-localization unit 222, the situation analysis unit 223 performs recognition processing regarding, for example, the position and state of a traffic light around the vehicle, the content of traffic regulations around the vehicle, and a traffic rule such as a lane in which the vehicle can travel.

Additionally, the situation analysis unit 223 performs recognition processing of the situation of the vehicle, the situation around the vehicle, and the situation and the like of the driver of the vehicle on the basis of data or signals from each unit of the control system 200 such as the detection unit 221 and the self-localization unit 222, the constructed map, and the like. As recognition processing of the situation of the vehicle, the situation analysis unit 223 performs recognition processing of, for example, the position, orientation, and movement (e.g., speed, acceleration, and moving direction) of the vehicle, and the presence or absence and content of abnormality, for example. Additionally, as recognition processing of the situation around the vehicle, the situation analysis unit 223 performs, for example, recognition processing of the type and location of surrounding stationary objects, the type, location, and motion (e.g., speed, acceleration, moving direction, and the like) of surrounding moving objects, the configuration and condition of road surface of surrounding roads, the ambient weather, temperature, humidity, and brightness, and the like. Moreover, as recognition processing of the situation and the like of the driver of the vehicle, the situation analysis unit 223 performs recognition processing of, for example, the physical condition, the wakefulness level, the concentration level, the fatigue level, the line-of-sight movement, a driving operation, and the like.

Additionally, the situation analysis unit 223 performs prediction processing of the situation of the vehicle, the situation around the vehicle, the situation of the driver, and the like on the basis of the recognition processing result regarding the traffic rules, the recognition processing result of the situation of the vehicle, the situation around the vehicle, the situation of the driver of the vehicle, and the like. As prediction processing of the situation of the vehicle, the situation analysis unit 223 performs prediction processing of, for example, behavior of the vehicle, occurrence of abnormality, a travelable distance, and the like. As prediction processing of the situation around the vehicle, the situation analysis unit 223 performs prediction processing of, for example, behavior of a moving object around the vehicle, a change in a signal state, a change in the environment such as weather, and the like. Additionally, as prediction processing of the situation of the driver, the situation analysis unit 223 performs prediction processing of, for example, a behavior, a physical condition, and the like of the driver. The situation analysis unit 223 supplies the constructed map and data indicating the results of the recognition processing and the prediction processing to the planning unit 224.

The planning unit 224 plans a route to a destination on the basis of data or signals from each unit of the control system 200 such as the situation analysis unit 223. The planning unit 224 plans a route from the current position to a designated destination on the basis of a global map in consideration of, for example, situations such as a traffic jam, an accident, a traffic regulation, a construction, and the like, and the physical condition of the driver, for example. Additionally, in order to safely travel the planned route within the planned time, the planning unit 224 plans actions such as start, stop, traveling direction, traveling lane, traveling speed, overtaking, and the like. Moreover, the planning unit 224 plans motions of the vehicle for achieving the planned action, such as acceleration, deceleration, the traveling trajectory, and the like. The planning unit 224 supplies data indicating the planned motion of the vehicle to the motion controller 225.

The motion controller 225 controls the motion of the vehicle. The motion controller 225 calculates a control target value of a driving force generation device or a braking device for achieving the motion of the vehicle planned by the planning unit 224 such as acceleration, deceleration, or a sudden stop, and a control target value of a steering mechanism for achieving travel to a destination, a lane change, and the like, and supplies a control command indicating the calculated control target value to the drive line controller 207. Additionally, the motion controller 225 performs processing of detecting an emergency such as collision, contact, entry into a danger zone, abnormality of the driver, or abnormality of the vehicle on the basis of the detection result of the detection unit 221, and in a case where occurrence of an emergency is detected, the motion controller 225 plans a motion of the vehicle for avoiding the emergency such as a sudden stop or a sudden turn, and supplies a control command for performing the planned motion by the vehicle to the drive line controller 207. Additionally, in a case where the detection unit 221 determines that the focus is abnormal, the motion controller 225 may stop the driving support function and the autonomous driving control function and switch to manual driving.

Figure 3:
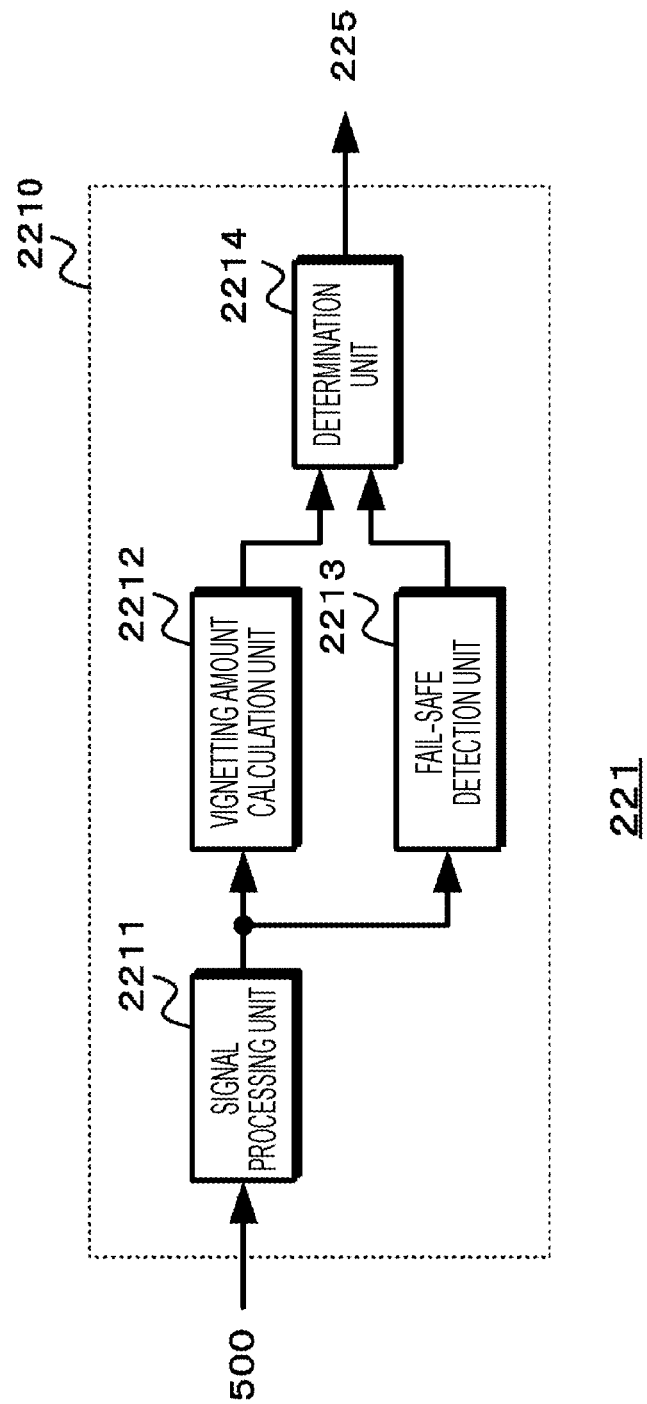
FIG. 3 is a diagram illustrating a part of a configuration of a detection unit.

FIG. 3 illustrates a part of the configuration of the detection unit. The detection unit 221 includes an abnormality detection unit 2210 that detects focus abnormality of the imaging unit 500 provided in the data acquisition unit 202. The abnormality detection unit 2210 includes a signal processing unit 2211, a vignetting amount calculation unit 2212, and a determination unit 2214. Additionally, the abnormality detection unit 2210 may further include a fail-safe detection unit 2213.

The signal processing unit 2211 performs signal processing on an image signal generated by the imaging unit 500 of the data acquisition unit 202 so that the vignetting amount can be calculated accurately. For example, when the signal level of the image signal is small, the boundary of the vignetting region becomes unclear, and the vignetting amount cannot be calculated accurately. Accordingly, the signal processing unit 2211 adjusts the signal level of the image signal generated by the imaging unit 500 so that the vignetting amount can be calculated accurately. Additionally, the signal processing unit 2211 may remove noise from the image signal so that the vignetting amount is not affected by noise. The signal processing unit 2211 outputs the processed image signal to the vignetting amount calculation unit 2212 and the fail-safe detection unit 2213.

The vignetting amount calculation unit 2212 determines a vignetting region from the image signal supplied from the signal processing unit 2211 and calculates the region size of the vignetting region as the vignetting amount. A vignetting region is, for example, a continuous pixel region from each of four corners having a signal level smaller than a region threshold set in advance for each corner, and the area (or number of pixels) of the vignetting region is set as the vignetting amount. The vignetting amount calculation unit 2212 outputs the calculated vignetting amount to the determination unit 2214.

The fail-safe detection unit 2213 detects whether to perform a fail-safe operation on the basis of the image signal supplied from the signal processing unit 2211. For example, when the sharpness of the captured image decreases due to focus abnormality or the like in the imaging unit 500 of the data acquisition unit 202, it becomes difficult to distinguish a peripheral subject or the like. Hence, the fail-safe detection unit 2213 detects the sharpness on the basis of the image signal supplied from the signal processing unit 2211, and in a case where the sharpness is lower than a preset sharpness threshold (in a case where image is blurred), performs warning or motion control so as not to execute the driving support function, the autonomous driving control function, or the like on the basis of the image signal supplied from the signal processing unit 2211. For example, a high-frequency component and an edge region is extracted from the image signal supplied from the signal processing unit 2211, and the intensity of the high-frequency component in a predetermined edge region size is calculated as the sharpness. Note that another method may be used to calculate the sharpness. The fail-safe detection unit 2213 outputs a comparison result between the sharpness and the preset sharpness threshold to the determination unit 2214 as the fail-safe detection result. Note that a threshold transmitted from a server outside the vehicle may be used as the sharpness threshold.

The determination unit 2214 determines whether the imaging unit 500 of the data acquisition unit 202 is normal on the basis of the vignetting amount calculated by the vignetting amount calculation unit 2212. The determination unit 2214 determines that the imaging unit 500 is normal when the vignetting amount calculated by the vignetting amount calculation unit 2212 indicates that the change in the vignetting amount at the time of focus abnormality detection processing with respect to the vignetting amount at the reference time (e.g., at time of alignment in manufacturing process, at start of initial use, or at time of repair completion) does not exceed a vignetting determination threshold, and determines that the imaging unit 500 is abnormal when the change in the vignetting amount exceeds the vignetting determination threshold. For example, the determination unit 2214 determines that a focus abnormality is detected when the change in the vignetting amount exceeds the vignetting determination threshold at any of the four corners of the captured image. The vignetting determination threshold for determining a change in the vignetting amount is set in advance. Note that a threshold transmitted from a server outside the vehicle may be used as the vignetting determination threshold.

Additionally, in a case where the fail-safe detection unit 2213 is further included, the determination unit 2214 determines whether the imaging unit 500 of the data acquisition unit 202 is normal using not only the vignetting amount but also the detection result of the fail-safe detection unit 2213. In a case where the detection result of the fail-safe detection unit 2213 indicates that the sharpness is lower than the preset sharpness threshold, the determination unit 2214 determines that the imaging unit 500 is abnormal regardless of the vignetting amount. The determination unit 2214 outputs the determination result to the motion controller 225. Note that the determination unit 2214 may determine the cause of the abnormality on the basis of the change in the vignetting amount.

The determination unit 2214 determines whether the focus deviation is in the normal range or is abnormal, and outputs the determination result. The determination result may include information indicating whether the determination is based on the sharpness or based on the vignetting amount, or may include a sharpness value, a sharpness threshold, each vignetting amount value, or a vignetting amount threshold.

<1-2. Operation of Vehicle>

Figure 4:
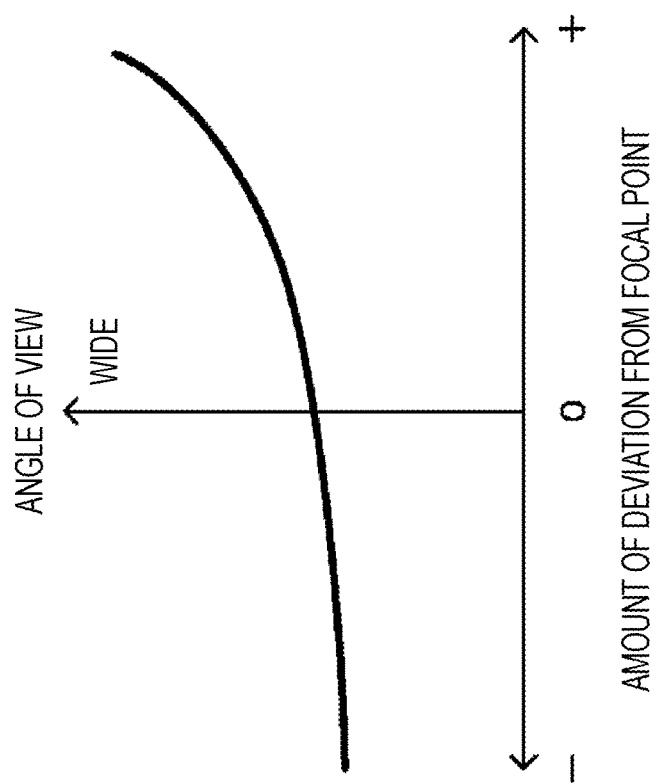
FIG. 4 is a diagram illustrating the relationship between the amount of deviation from a focal point and the angle of view.

FIG. 4 illustrates the relationship between the amount of deviation from a focal point and the angle of view. The imaging unit has a property that the angle of view increases as the spacing between a lens and an image sensor increases, and the angle of view decreases as the distance decreases. Additionally, as the distance from the focal point increases, the resolution decreases and the spatial resolution (MTF) decreases. Accordingly, the present technology detects focus abnormality on the basis of a change in the angle of view. Specifically, the imaging unit 500 used in the data acquisition unit 202 generates a vignetting region around the imaging surface of the image sensor by using a lens having a small effective image circle with respect to the size of the image sensor. Additionally, the detector determines focus abnormality on the basis of a change in a vignetting region (vignetting amount).

Figure 5:
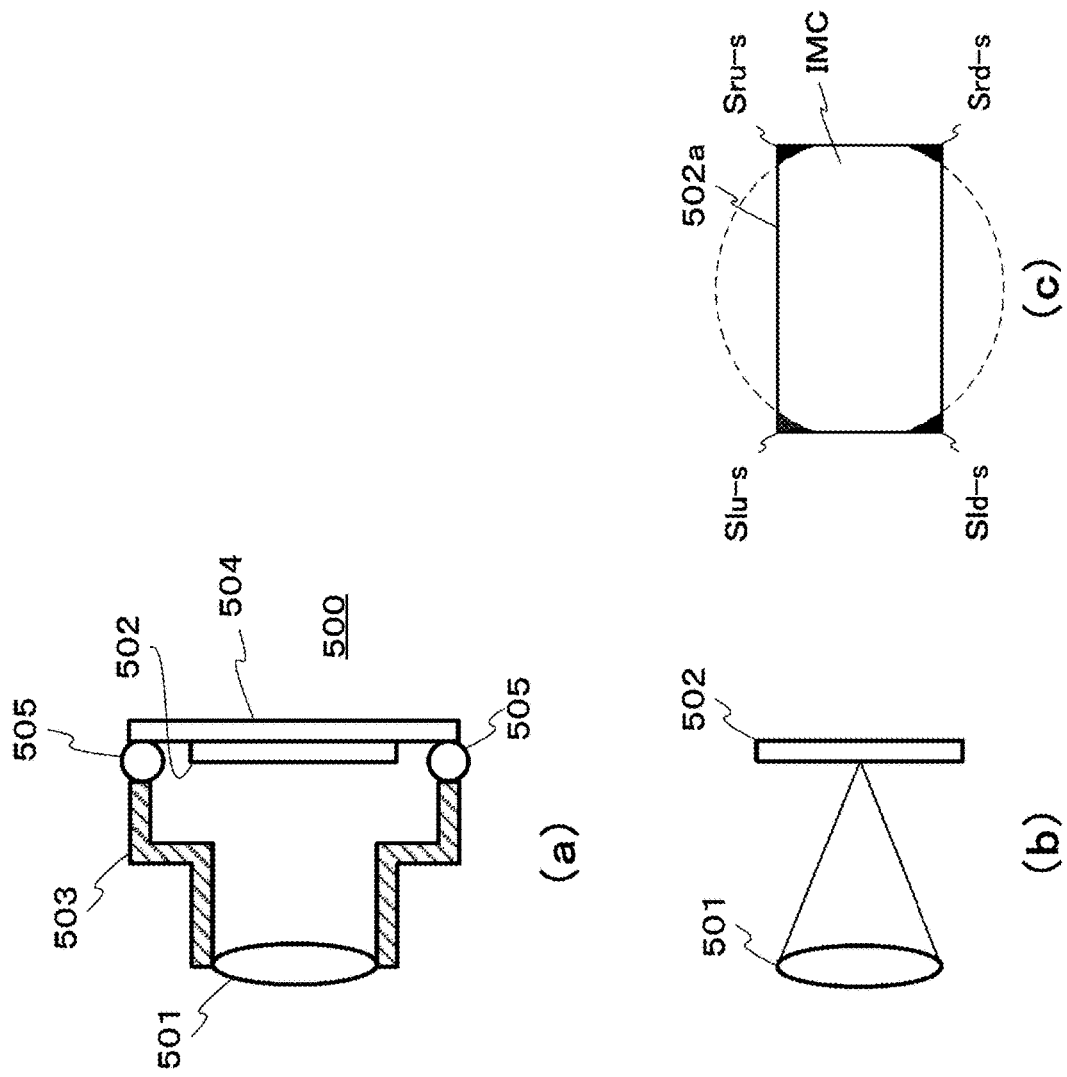
FIG. 5 is a diagram illustrating a state of an imaging unit at a reference time.

FIG. 5 illustrates a state of the imaging unit at the reference time. Part (a) of FIG. 5 illustrates a configuration of the imaging unit 500 provided in the data acquisition unit 202. The imaging unit 500 includes a lens 501 and an image sensor 502 such as a complementary metal oxide semiconductor (CMOS) or a charge coupled device (CCD). The lens 501 is fixedly provided on a lens holder 503, and the image sensor 502 is fixedly provided on a base part 504. The lens holder 503 is fixed to the base part 504 using a fixing member 505.

Part (b) of FIG. 5 illustrates a positional relationship between the lens 501 and the image sensor 502, and the image sensor 502 is provided at the focal position of lens 501. Part (c) of FIG. 5 illustrates a positional relationship between an effective image circle IMC and the image sensor. For example, the optical axis position of the lens 501 is the central position of an imaging surface 502a of the image sensor 502, the effective image circle IMC is small with respect to the imaging surface 502a, and vignetting regions are generated at the four corners of the imaging surface 502a. Note that at the reference time, the upper right vignetting region has a region size Sru-s, the upper left vignetting region has a region size Slu-s, the lower right vignetting region has a region size Srd-s, and the lower left vignetting region has a region size Sld-s.

The detection unit 221 determines whether a focus abnormality occurs in the imaging unit 500 on the basis of the region size of the vignetting region (vignetting amount) at the reference time and the region size (vignetting amount) detected during the subsequent focus abnormality detection processing.

Figure 6:
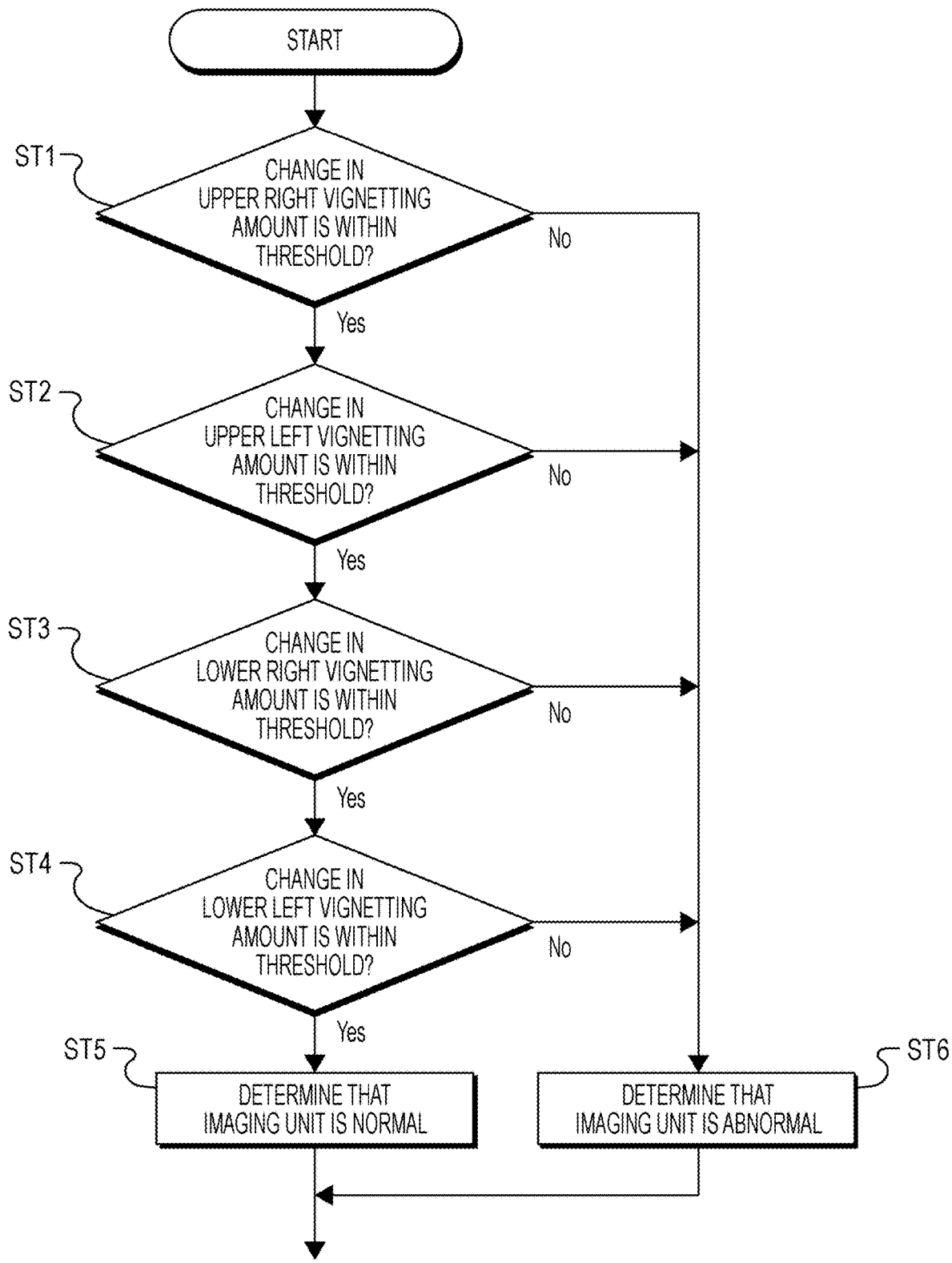
FIG. 6 is a flowchart illustrating an operation of the detection unit.

FIG. 6 is a flowchart illustrating the operation of the detection unit 221 in the control system 200, and this operation is performed, for example, at the startup of the imaging unit 500 or before the start of autonomous driving of the vehicle 20. Note that FIG. 6 illustrates the operation in a case where the fail-safe detection unit 2213 is not provided.

Additionally, this operation may be performed not only before the start of autonomous driving but also during autonomous driving (when autonomous driving function (including driver assist function) is used), or may be performed during manual driving or in response to an operation of the driver or the like.

In step ST1, the detection unit determines whether the change in the upper right vignetting amount is within a threshold. The detection unit 221 calculates a region size Sru of the upper right vignetting region as the upper right vignetting amount, and determines whether the calculated region size Sru is a change within a vignetting determination threshold (e.g., within range of ±Ts %) with respect to the region size Sru-s at the reference time. The detection unit 221 proceeds to step ST2 if the calculated change in the upper right vignetting region is within the vignetting determination threshold, and proceeds to step ST6 if the change exceeds the vignetting determination threshold.

In step ST2, the detection unit determines whether the change in the upper left vignetting amount is within a threshold. The detection unit 221 calculates a region size Slu of the upper left vignetting region as the upper left vignetting amount, and determines whether the calculated region size Slu is a change within a vignetting determination threshold (e.g., within range of ±Ts %) with respect to the region size Slu-s at the reference time. The detection unit 221 proceeds to step ST3 if the calculated change in the upper left vignetting region is within the vignetting determination threshold, and proceeds to step ST6 if the change exceeds the vignetting determination threshold.

In step ST3, the detection unit determines whether the change in the lower right vignetting amount is within a threshold. The detection unit 221 calculates a region size Srd of the lower right vignetting region as the lower right vignetting amount, and determines whether the calculated region size Srd is a change within a vignetting determination threshold (e.g., within range of ±Ts %) with respect to the region size Srd-s at the reference time. The detection unit 221 proceeds to step ST4 if the calculated change in the lower right vignetting region is within the vignetting determination threshold, and proceeds to step ST6 if the change exceeds the vignetting determination threshold.

In step ST4, the detection unit determines whether the change in the lower left vignetting amount is within a threshold. The detection unit 221 calculates a region size Sld of the lower left vignetting region as the lower left vignetting amount, and determines whether the calculated region size Sld is a change within a vignetting determination threshold (e.g., within range of ±Ts %) with respect to the region size Sld-s at the reference time. The detection unit 221 proceeds to step ST5 if the calculated change in the lower left vignetting region is within the vignetting determination threshold, and proceeds to step ST6 if the change exceeds the vignetting determination threshold.

In step ST5, the detection unit determines that the imaging unit 500 is normal. The detection unit 221 generates a determination result indicating that the focus deviation of the imaging unit 500 of the data acquisition unit 202 is in a normal range, and outputs the determination result to the motion controller 225. Accordingly, the autonomous driving controller 213 determines whether or not the driving support function or the autonomous driving control function of the vehicle 20 using the captured image acquired by the imaging unit 500 of the data acquisition unit 202 can be executed.

Then, in a case where the driving support function and the autonomous driving function may be performed, the autonomous driving controller 213 executes the driving support function and the autonomous driving function.

In step ST6, the detection unit determines that the imaging unit 500 is abnormal. The detection unit 221 generates a determination result indicating that the focus deviation of the imaging unit 500 of the data acquisition unit 202 exceeds the normal range and is abnormal, and outputs the determination result to the motion controller 225. Accordingly, the autonomous driving controller 213 stops the driving support function and the autonomous driving control function using the captured image acquired by the imaging unit 500 of the data acquisition unit 202.

In this manner, the detection unit 221 can accurately detect focus abnormality (focus deviation) on the basis of a change in a vignetting region in a captured image of one viewpoint.

Figure 7:
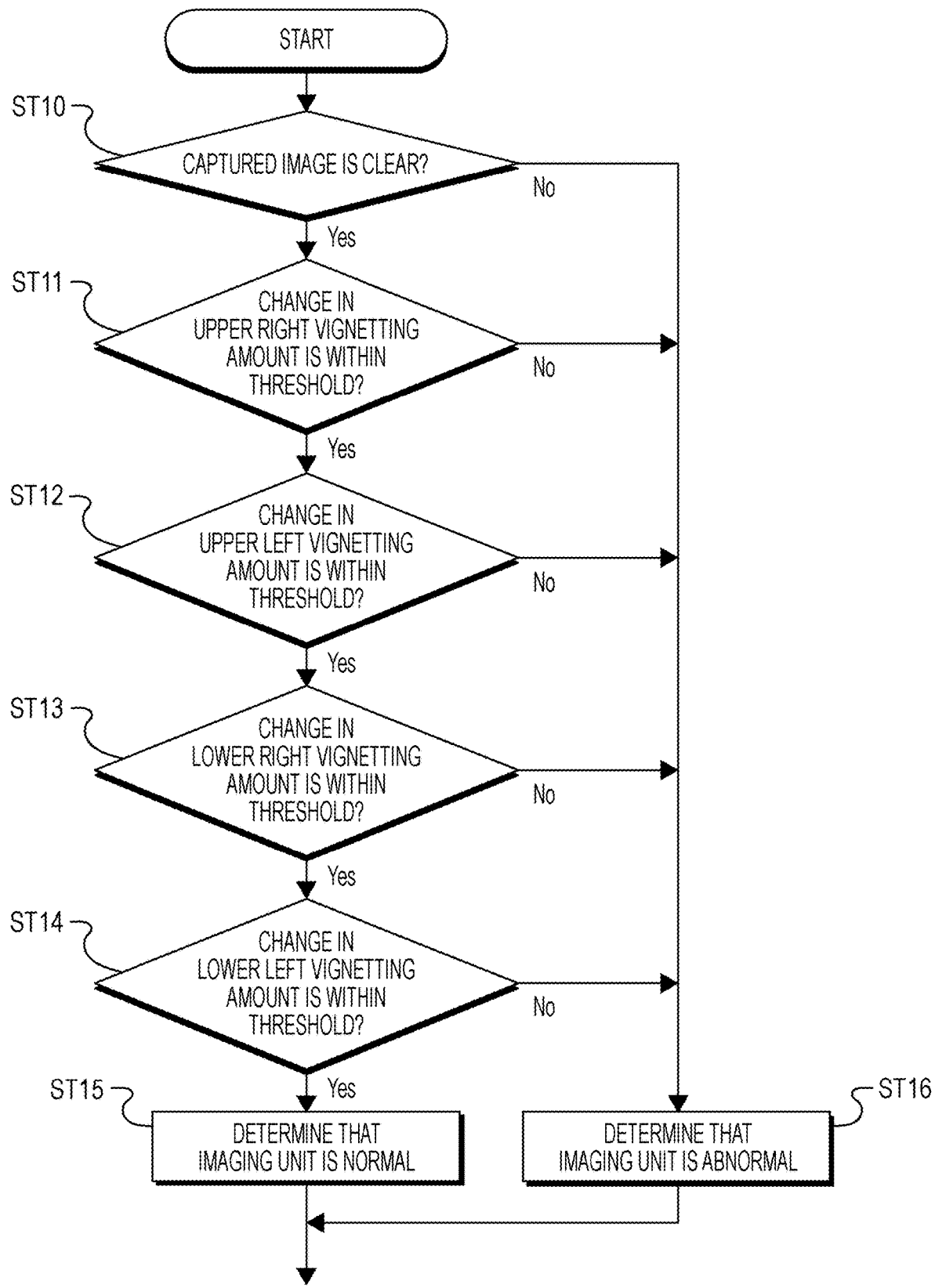
FIG. 7 is a flowchart illustrating another operation of the detection unit.

Next, the operation in a case where the fail-safe detection unit is provided will be described. FIG. 7 is a flowchart illustrating another operation of the detection unit 221 of the control system 200. Note that FIG. 7 illustrates the operation in a case where the fail-safe detection unit 2213 is provided, and this operation is also performed, for example, at the startup of the imaging unit 500 or before the start of autonomous driving of the vehicle 20, similarly to the operation illustrated in FIG. 6.

In step ST10, the detection unit determines whether the sharpness of the captured image is equal to or greater than a preset threshold. The detection unit 221 calculates the sharpness of the captured image acquired by the imaging unit 500 of the data acquisition unit 202. The detection unit 221 proceeds to step ST11 if the calculated sharpness is equal to or greater than the preset sharpness threshold, and proceeds to step ST16 if the calculated sharpness is less than the preset sharpness threshold (if image is blurred).

In step ST11, the detection unit determines whether the change in the upper right vignetting amount is within a threshold. The detection unit 221 calculates a region size Sru of the upper right vignetting region as the upper right vignetting amount, and determines whether the calculated region size Sru is a change within a vignetting determination threshold (e.g., within range of ±Ts %) with respect to the region size Sru-s at the reference time. The detection unit 221 proceeds to step ST12 if the calculated change in the upper right vignetting region is within the vignetting determination threshold, and proceeds to step ST16 if the change exceeds the vignetting determination threshold.

In step ST12, the detection unit determines whether the change in the upper left vignetting amount is within a threshold. The detection unit 221 calculates a region size Slu of the upper left vignetting region as the upper left vignetting amount, and determines whether the calculated region size Slu is a change within a vignetting determination threshold (e.g., within range of ±Ts %) with respect to the region size Slu-s at the reference time. The detection unit 221 proceeds to step ST13 if the calculated change in the upper left vignetting region is within the vignetting determination threshold, and proceeds to step ST16 if the change exceeds the vignetting determination threshold.

In step ST13, the detection unit determines whether the change in the lower right vignetting amount is within a threshold. The detection unit 221 calculates a region size Srd of the lower right vignetting region as the lower right vignetting amount, and determines whether the calculated region size Srd is a change within a vignetting determination threshold (e.g., within range of ±Ts %) with respect to the region size Srd-s at the reference time. The detection unit 221 proceeds to step ST14 if the calculated change in the lower right vignetting region is within the vignetting determination threshold, and proceeds to step ST16 if the change exceeds the vignetting determination threshold.

In step ST14, the detection unit determines whether the change in the lower left vignetting amount is within a threshold. The detection unit 221 calculates a region size Sld of the lower left vignetting region as the lower left vignetting amount, and determines whether the calculated region size Sld is a change within a vignetting determination threshold (e.g., within range of ±Ts %) with respect to the region size Sld-s at the reference time. The detection unit 221 proceeds to step ST15 if the calculated change in the lower left vignetting region is within the vignetting determination threshold, and proceeds to step ST16 if the change exceeds the vignetting determination threshold.

In step ST15, the detection unit determines that the imaging unit 500 is normal. The detection unit 221 generates a determination result indicating that the focus deviation of the imaging unit 500 of the data acquisition unit 202 is in a normal range, and outputs the determination result to the motion controller 225. Accordingly, the autonomous driving controller 213 determines whether or not the driving support function or the autonomous driving control function of the vehicle 20 using the captured image acquired by the imaging unit 500 of the data acquisition unit 202 can be executed. Then, in a case where the driving support function and the autonomous driving function may be performed, the autonomous driving controller 213 executes the driving support function and the autonomous driving function.

In step ST16, the detection unit determines that the imaging unit 500 is abnormal. The detection unit 221 generates a determination result indicating that the focus deviation of the imaging unit 500 of the data acquisition unit 202 exceeds the normal range and is abnormal, and outputs the determination result to the motion controller 225. Accordingly, the autonomous driving controller 213 stops the driving support function and the autonomous driving control function of the vehicle 20 using the captured image acquired by the imaging unit 500 of the data acquisition unit 202.

As described above, in a case where it is determined, on the basis of image data of one viewpoint, that the sharpness of the captured image is equal to or greater than the preset sharpness threshold, the detection unit 221 can accurately detect focus abnormality on the basis of the change in the vignetting region in the captured image. Additionally, in a case where the sharpness of the captured image is lower than the preset sharpness threshold (in a case where image is blurred), the driving support function based on the captured image with low sharpness is stopped. Hence, the vehicle 20 can prevent autonomous driving or the like from being performed in a situation where the surrounding situation cannot be grasped accurately on the basis of the captured image.

Figure 8:
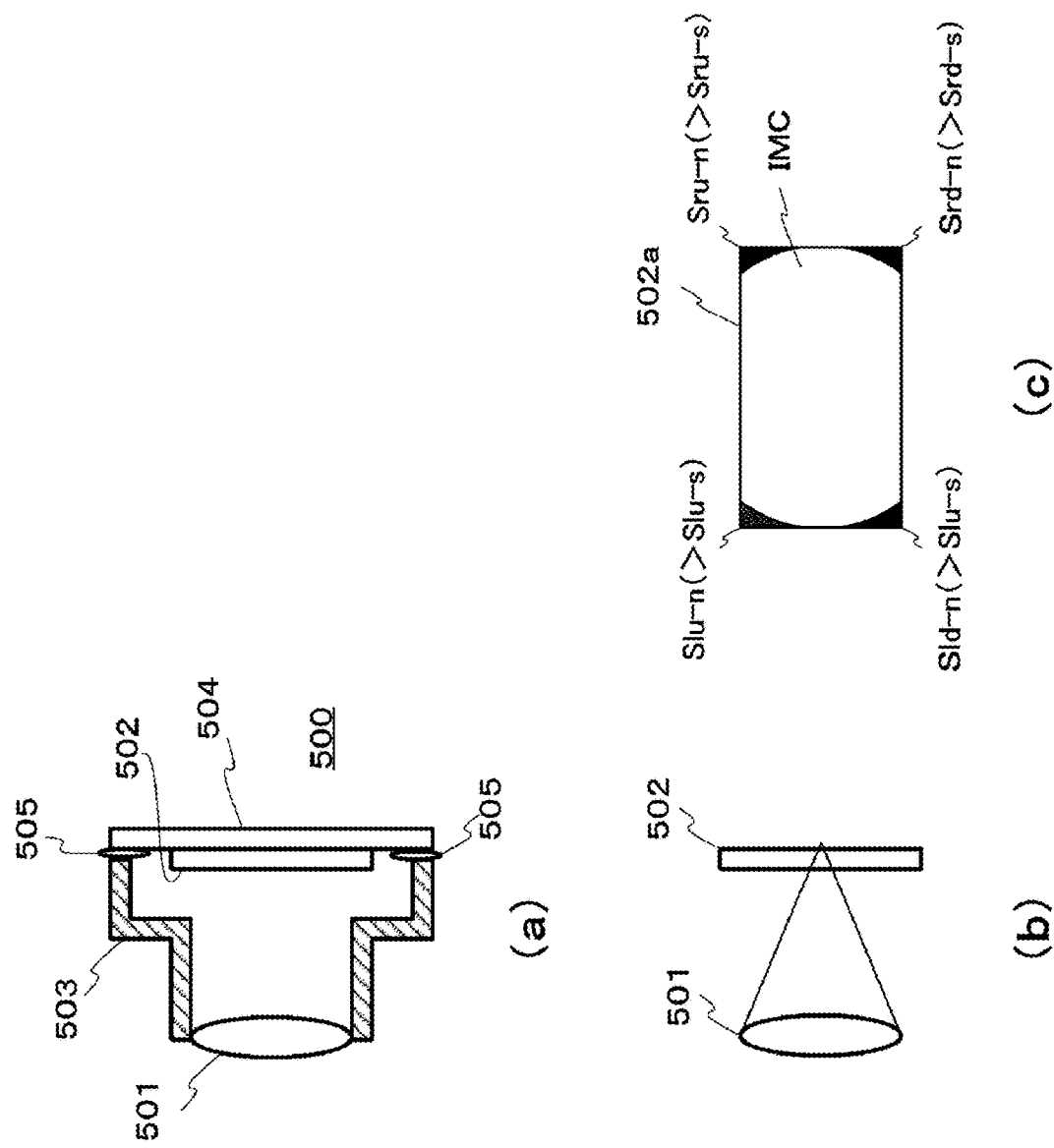
FIG. 8 is a diagram illustrating a case where the imaging unit changes from a state at the reference time.

FIG. 8 illustrates a case where the imaging unit changes from the state at the reference time. Part (a) of FIG. 8 illustrates a case where the spacing between the lens 501 and the image sensor 502 becomes narrower than that at the reference time due to a temporal change, an external force, or the like. In this case, as illustrated in part (b) of FIG. 8, the image sensor 502 is closer to the lens 501 than the focal position of the lens 501. As illustrated in part (c) of FIG. 8, the effective image circle IMC becomes smaller than that at the reference time, and the region sizes of the vignetting regions at the four corners become larger than those at the reference time. That is, a region size Sru-n of the upper right vignetting region is larger than the region size Sru-s. Similarly, a region size Slu-n of the upper left vignetting region is larger than the region size Slu-s, a region size Srd-n of the lower right vignetting region is larger than the region size Srd-s, and a region size Sld-n of the lower left vignetting region is larger than the region size Sld-s. Accordingly, when the region sizes of the vignetting regions at the four corners become larger than those at the reference time and a change in any of the vignetting regions exceeds the vignetting determination threshold, the detection unit 221 determines that the imaging unit 500 is abnormal.

FIG. 9 illustrates another case where the imaging unit changes from the state at the reference time. Part (a) of FIG. 9 illustrates a case where the spacing between the lens 501 and the image sensor 502 becomes wider than that at the reference time due to a temporal change, an external force, or the like. In this case, as illustrated in part (b) of FIG. 9, the image sensor 502 is farther from the lens 501 than the focal position of the lens 501. As illustrated in part (c) of FIG. 9, the effective image circle IMC is larger than that at the reference time, and the region sizes of the vignetting regions at the four corners become smaller than those at the reference time. That is, a region size Sru-f of the upper right vignetting region is smaller than the region size Sru-s. Similarly, a region size Slu-f of the upper left vignetting region is smaller than the region size Slu-s, a region size Srd-f of the lower right vignetting region is smaller than the region size Srd-s, and a region size Sld-f of the lower left vignetting region is smaller than the region size Sld-s. Accordingly, when the region sizes of the vignetting regions at the four corners become smaller than those at the reference time and a change in any of the vignetting regions exceeds the vignetting determination threshold, the detection unit 221 determines that the imaging unit 500 is abnormal.

FIG. 10 illustrates a case where the optical axis of the lens is shifted in the imaging unit. Part (a) of FIG. 10 illustrates a case where the optical axis of the lens 501 is inclined with respect to the image sensor 502 due to a temporal change, an external force, or the like. In this case, as illustrated in part (b) of FIG. 10, the focal position of the lens moves from the center of the image sensor 502, and as illustrated in part (c) of FIG. 10, the effective image circle IMC moves from the position at the reference time, and the region sizes of the vignetting regions at the four corners change. For example, in the case of part (c) of FIG. 10, a region size Sru-t of the upper right vignetting region is smaller than the region size Sru-s, and a region size Srd-t of the lower right vignetting region is smaller than the region size Srd-s. Additionally, a region size Slu-t of the upper left vignetting region is larger than the region size Slu-s, and a region size Sld-t of the lower left vignetting region is smaller than the region size Sld-s. Accordingly, when the region size of the vignetting region at any of the four corners becomes larger or smaller than that at the reference time and a change in the vignetting region exceeds the vignetting determination threshold, the detection unit 221 determines that the imaging unit 500 is abnormal.

Note that while FIG. 10 illustrates a case where the optical axis of the lens 501 is inclined, in a case where the image sensor is inclined, too, the region sizes of the vignetting regions at the four corners change as illustrated in part (c) of FIG. 10. Accordingly, the detection unit 221 can similarly detect focus abnormality due to inclination of the image sensor.

Figure 11:
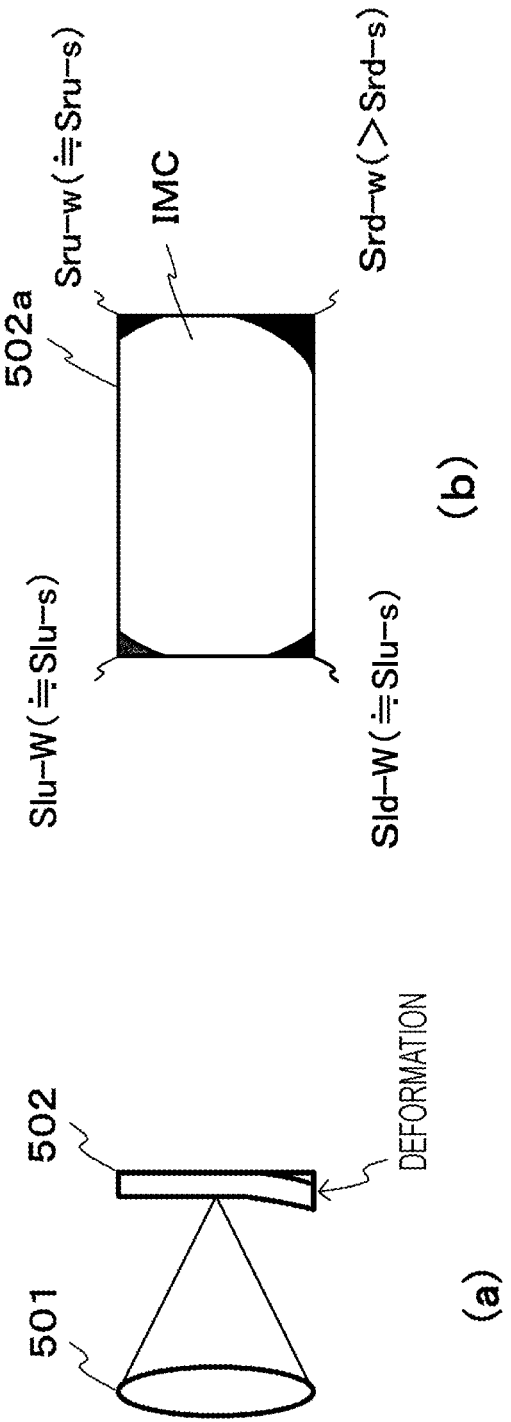
FIG. 11 is a diagram illustrating a case where a corner of an image sensor is deformed.

Moreover, the detection unit 221 can similarly detect focus abnormality caused by deformation of a corner of the image sensor. FIG. 11 illustrates a case where a corner of the image sensor is deformed. As illustrated in part (a) of FIG. 11, the image sensor 502 is at the focal position of the lens 501, and the lower right corner is deformed. In this case, as illustrated in part (b) of FIG. 11, the effective image circle IMC is substantially equal to that at the reference time, and the region size of the vignetting region corresponding to the deformed corner is different from that at the reference time. That is, a region size Sru-w of the upper right vignetting region is substantially equal to the region size Sru-s, a region size Slu-w of the upper left vignetting region is substantially equal to the region size Slu-s, and a region size Sld-w of the lower left vignetting region is substantially equal to the region size Sld-s. Additionally, a region size Srd-w of the lower right vignetting region is larger than the region size Sld-s. Accordingly, when the change in the lower right vignetting region exceeds the vignetting determination threshold, detection unit 221 determines that the imaging unit 500 is abnormal.

According to the present technology as described above, the detection unit can detect, on the basis of a change in the vignetting region, focus abnormality caused by a change in the positional relationship between the lens and the image sensor due to a change in the fixed state between the lens holder 503 and the base part 504, deformation of the image sensor, or the like due to temporal change or an external force depending on the use environment. Additionally, the detection unit can detect focus abnormality in which the sharpness of the captured image that can be acquired by the image sensor decreases due to lens deterioration or the like.

For example, the detection unit 221 can easily and accurately detect focus abnormality caused by a change in a positional relationship between the lens and the image sensor or deterioration of the lens due to a case where an unexpected impact is applied to the imaging unit 500, a case where the imaging unit 500 is used under a temperature environment not covered by the guarantee, a case where the imaging unit 500 is subjected to a chemical or the like, a case of an accidental failure, or the like, without using a spatial resolution measurement chart, a wide work space for abnormality detection, a conversion lens for reducing the work space, or the like.

Moreover, since the change in the vignetting region corresponds to the cause of the focus abnormality as described above, the detection unit 221 may determine the cause of the abnormality on the basis of the change in the vignetting region. For example, as illustrated in FIG. 8, when the region size of the vignetting regions at the four corners is large, the detection unit 221 determines that the narrowed spacing between the lens and the image sensor is the cause of the abnormality. Additionally, the detection unit 221 may send notification regarding the determined cause to the user or the like of the vehicle 20 from the output unit 206. In this way, if notification of the cause of the abnormality is sent on the basis of the change in the vignetting region, a service center or the like can easily perform work for eliminating the abnormal state.

Incidentally, in a case where the surroundings of the vehicle is dark, it is difficult for the detection unit 221 to determine the boundary of the vignetting region in the captured image even if the signal level of the image signal is adjusted by the signal processing unit 2211. Accordingly, the vehicle 20 may include a light source unit LT that emits illumination light so that the imaging unit 500 can capture a bright image. FIG. 12 illustrates a case where the illumination light is not used and a case where the illumination light is used. In a case where the surroundings of the vehicle is dark, it is difficult for the detection unit 221 to calculate the region size of the vignetting region because the captured image is dark as illustrated in part (a) of FIG. 12 unless the illumination light is used. However, if the detection unit 221 illuminates a subject OB using the light source unit LT as illustrated in part (b) of FIG. 12, the vignetting region outside the effective image circle IMC can be easily determined as illustrated in part (c) of FIG. 12. Accordingly, the detection unit 221 can accurately detect focus abnormality even when the surroundings of the vehicle are dark.

Figure 13:
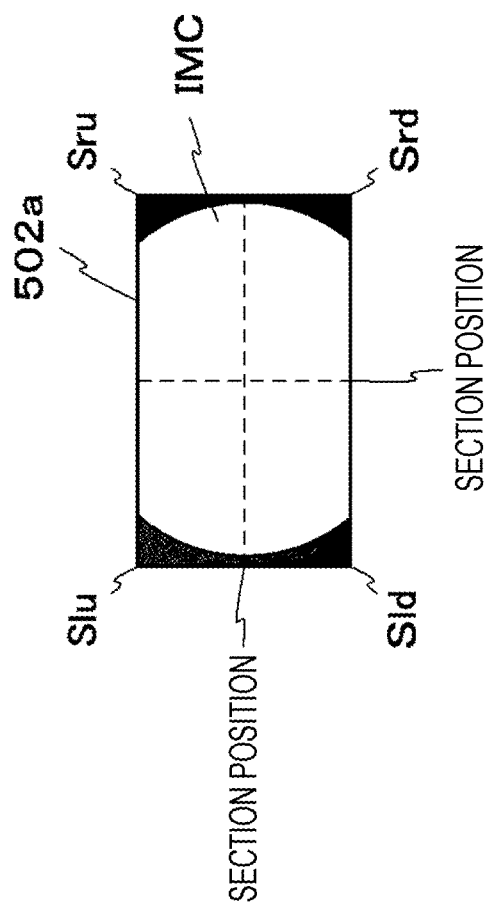
FIG. 13 is a diagram illustrating a case where an imaging surface is divided in the vertical direction and the horizontal direction.

Note that as in the present technology, in a case where a vignetting region is generated around the imaging surface of the image sensor using a lens having an effective image circle smaller than the size of the image sensor, when the vignetting region is continuous, it is difficult for the detection unit to calculate the region sizes of the vignetting regions at the four corners. In such a case, the detection unit may divide the imaging surface of the image sensor in advance and calculate the region size of the vignetting region for each divided region. FIG. 13 illustrates a case where the imaging surface is divided in the vertical direction and the horizontal direction with the optical axis position as a reference. Note that in FIG. 13, the section positions are indicated by broken lines. In this way, by dividing the imaging surface into four sections and calculating the region size of the vignetting region for each section region, the detection unit can calculate the region size of the vignetting region at the upper right, upper left, lower right, and lower left even when the vignetting region is continuous.

Additionally, the operations illustrated in FIGS. 6 and 7 may be performed not only at the startup of the imaging unit but also at a timing according to the usage status of the imaging unit, for example. For example, the operations illustrated in FIGS. 6 and 7 may be performed every time a predetermined time elapses from the startup, or may be performed when the temperature change exceeds a predetermined value or when the weather changes.

Additionally, in the present technology, a vignetting region is generated at an end of the imaging surface of the image sensor by using a lens having an effective image circle smaller than the size of the image sensor. Accordingly, in a case of performing various types of image processing such as subject recognition, for example, using the image acquired by the imaging unit 500, the detection unit can cut out and use an image of a predetermined region at the center excluding the vignetting region, for example, to perform the various types of image processing without being affected by vignetting.

<1-3. Modification>

Incidentally, while the above-described embodiment has illustrated the case where the autonomous driving controller 213 detects a focus abnormality on the basis of the image data acquired by the imaging unit 500 provided in the data acquisition unit 202 of the vehicle 20, the detection of the focus abnormality and the like may be performed by an imaging device that images the front of the vehicle, such as a front sensing camera (FSC).

Figure 14:
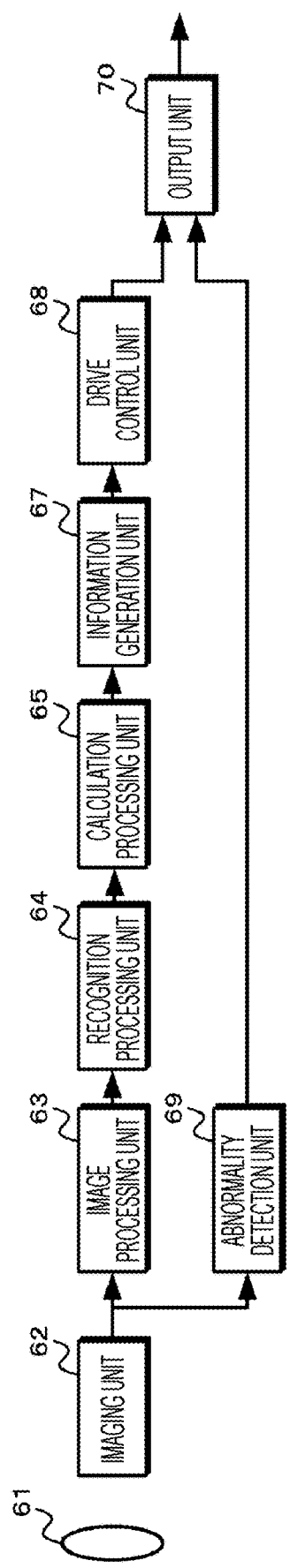
FIG. 14 is a diagram illustrating a case where functions such as focus abnormality detection are provided in an imaging device that images the front of the vehicle.

FIG. 14 illustrates a case where functions such as focus abnormality detection are provided in an imaging device that images the front of the vehicle.

An imaging device 60f includes an optical system 61, an imaging unit 62, an image processing unit 63, a recognition processing unit 64, a calculation processing unit 65, an information generation unit 67, a drive control unit 68, an abnormality detection unit 69, and an output unit 70.

The optical system 61 includes the lens 501 illustrated in FIG. 5 and the like, and forms an optical image indicating the front of the vehicle and the periphery of the vehicle on the imaging unit 62. Note that as illustrated in FIG. 5 and the like, the optical system 61 is attached to the imaging unit 62 using the lens holder 503 and the fixing member 505.

The imaging unit 62 includes the image sensor 502 and a drive circuit that drives the image sensor 502 illustrated in FIG. 5, and the like, and generates an image signal indicating an optical image. The technology of the present application is suitable for an imaging device using an optical system in which the vertical and horizontal sizes of an imaging region in an image sensor are, for example, 4.32 mm and 8.64 mm (1/1.7 type), the number of pixels is several M pixels or more (in particular, 7M pixels or more), and an allowable range of focal position deviation is within ±several μm (e.g., ±3 μm). Additionally, the technology of the present application is suitable for an imaging device using an image sensor having a higher pixel density (e.g., area per pixel is smaller than 6.1 (μm×μm)) than the image sensor of 1/1.7 type having 7M pixels, and has an optical system having an allowable range of focal position deviation within ±several μm (e.g., ±3 μm). The imaging unit 62 outputs the generated image signal to the image processing unit 63 and the abnormality detection unit 69.

The image processing unit 63 performs processing for making it easy to recognize an object in the captured image acquired by the imaging unit 62. For example, the image processing unit 63 performs image processing such as automatic exposure control, automatic white balance adjustment, and high dynamic range synthesis, and outputs the processed image to the recognition processing unit 64.

The recognition processing unit 64 performs object recognition processing using the processed image output from the image processing unit 63, and detects, for example, a vehicle, a pedestrian, an obstacle, a traffic light, a traffic sign, a lane of a road (lane), a curbstone of a sidewalk, and the like from the processed image. The recognition processing unit 64 outputs the recognition result to the calculation processing unit 65.

The calculation processing unit 65 calculates object information regarding the object detected by the recognition processing unit 64. The calculation processing unit 65 calculates, for example, the shape of the object, the distance to the object, the moving direction and the moving speed of the object, and the like as object information. Additionally, the calculation processing unit 65 uses multiple captured images that are temporally continuous when calculating dynamic object information.

The information generation unit 67 generates drive control information including drive contents necessary for the vehicle. The information generation unit 67 determines drive contents to be executed by the vehicle on the basis of the recognition result of the recognition processing unit 64 and the object information calculated by the calculation processing unit 65, and generates drive control information including the drive contents.

Examples of the driving content of the vehicle include a change in speed (acceleration and deceleration), a change in traveling direction, and the like. As a specific example, the information generation unit 67 determines that deceleration is necessary in a case where the inter-vehicle distance between the vehicle and the preceding vehicle is small, and determines that it is necessary to change the traveling direction toward the center of the lane in a case where the vehicle is likely to depart from the lane.

The information generation unit 67 transmits drive control information to the drive control unit 68. Note that the information generation unit 67 may generate information other than drive control information. For example, the information generation unit 67 may detect the brightness of the surrounding environment from the processed image and generate illumination control information for turning on the headlights of the vehicle when the surrounding environment is dark.

The drive control unit 68 generates a drive control signal based on the drive control information and outputs the drive control signal from the output unit 70. For example, the drive control unit 68 can accelerate the vehicle with the driving force generation mechanism, decelerate the vehicle with the braking mechanism, and change the traveling direction of the vehicle with the steering mechanism.

The abnormality detection unit 69 is configured similarly to the abnormality detection unit 2210 illustrated in FIG. 3. The abnormality detection unit 69 performs signal processing such as signal level adjustment, noise removal, and the like on the image signal generated by the imaging unit 62 so that the vignetting amount can be calculated accurately. Additionally, the abnormality detection unit 69 determines a vignetting region from the image signal and calculates a region size of the vignetting region as a vignetting amount. The abnormality detection unit 69 determines whether an imaging unit 60f is normal on the basis of the calculated vignetting amount, and determines that the imaging unit 60f is normal when the calculated vignetting amount indicates that the change in the vignetting amount at the time of focus abnormality detection processing with respect to the vignetting amount at the reference time does not exceed the vignetting determination threshold, and determines that the imaging unit 60f is abnormal when the calculated vignetting amount exceeds the vignetting determination threshold.

Additionally, the abnormality detection unit 69 detects the sharpness on the basis of the image signal generated by the imaging unit 62, and in a case where the sharpness is lower than a preset sharpness threshold (in a case where image is blurred), performs warning or operation control so as not to execute the driving support function, the autonomous driving control function, or the like based on the captured image acquired by the imaging unit 62.

Moreover, the abnormality detection unit 69 determines whether the imaging unit 62 is normal using the vignetting amount and the fail-safe detection result by using the comparison result between the sharpness and the sharpness threshold as the fail-safe detection result, and determines that the imaging unit 62 is abnormal regardless of the vignetting amount when it is indicated that the sharpness is lower than the preset sharpness threshold. The abnormality detection unit 69 outputs the determination result to the output unit 70.

The output unit 70 outputs the drive control signal generated by the drive control unit 68 and the determination result by the abnormality detection unit 69 to another functional block of the vehicle. Additionally, the output unit 70 may output the image signal generated by the imaging unit 62 or the image signal processed by the image processing unit 63 to another functional block.

Additionally, detection of focus abnormality and the like are not limited to the imaging device that images the front of the vehicle, and may be provided in an imaging device that images the rear of the vehicle or the side of the vehicle.

Figure 15:
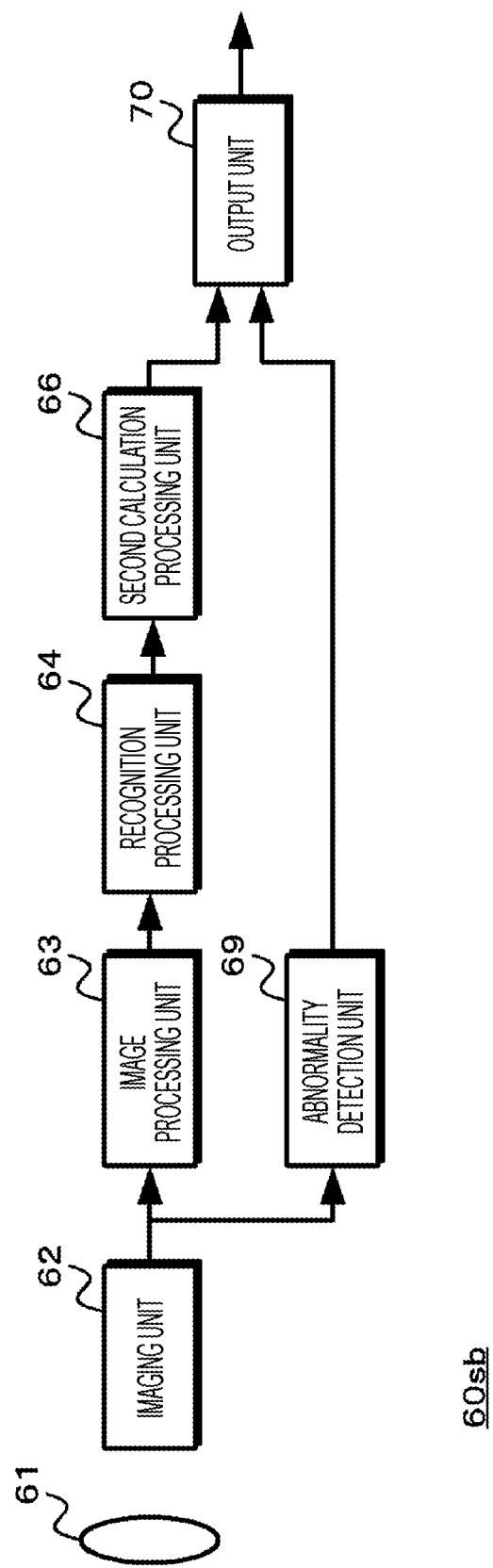
FIG. 15 is a diagram illustrating a case where functions such as focus abnormality detection are provided in an imaging device that images the rear or the side of the vehicle.

FIG. 15 illustrates a case where functions such as detection of focus abnormality are provided in an imaging device that images the rear of the vehicle or the side of the vehicle.

An imaging device 60*sb* includes an optical system 61, an imaging unit 62, an image processing unit 63, a recognition processing unit 64, a second calculation processing unit 66, an abnormality detection unit 69, and an output unit 70. Additionally, the optical system 61, the imaging unit 62, the image processing unit 63, the recognition processing unit 64, the abnormality detection unit 69, and the output unit 70 are configured similarly to those of the above-described imaging device 60*f*.

The second calculation processing unit 66 calculates object information regarding the object detected by the recognition processing unit 64. The second calculation processing unit 66 calculates the distance to the object as object information on the basis of, for example, the positional relationship between the detected position of the object and the vehicle, and outputs the distance through the output unit 70.

The output unit 70 outputs the object information calculated by the second calculation processing unit 66 and the determination result by the abnormality detection unit 69 to another functional block of the vehicle. Additionally, the output unit 70 may output the image signal generated by the imaging unit 62 or the image signal processed by the image processing unit 63 to another functional block.

Note that in a case where the drive control of the vehicle is performed in accordance with the object included in the captured image of the rear of the vehicle or the side of the vehicle, the imaging device 60*sb* may include the information generation unit 67 and the drive control unit 68.

Additionally, while log information is stored in storage unit 211 of vehicle 20 in the above embodiment, the log information may be stored in the imaging device (60*f* or 60*sb*).

As described above, even if the imaging device is provided separately from the vehicle 20, the present technology can perform an operation similar to that of the above-described embodiment and obtain a similar effect.

<1-4. Configuration and Operation of Server>

Figure 16:
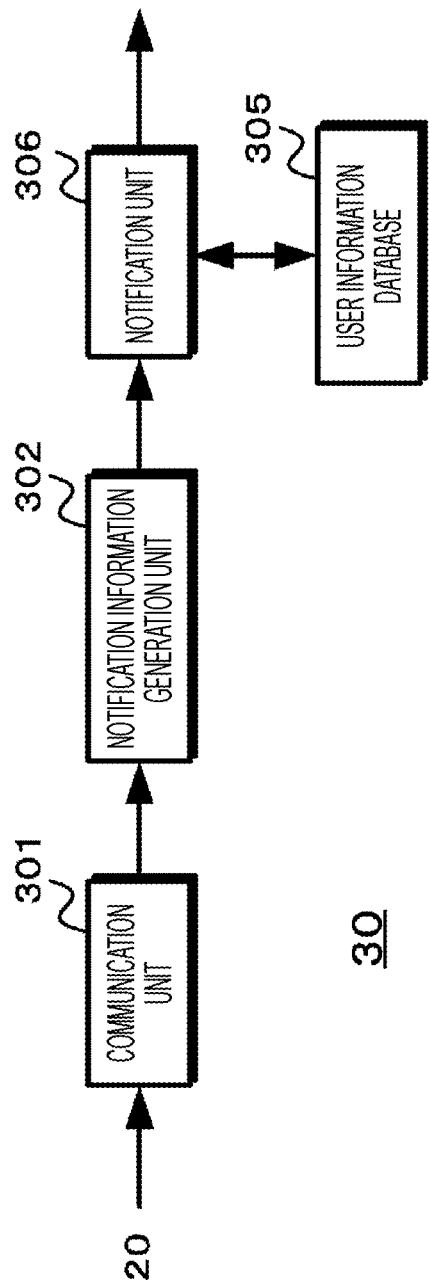
FIG. 16 is a diagram illustrating a configuration of the server.

Next, the configuration and operation of the server will be described. FIG. 16 illustrates a configuration of the server. The server 30 includes a communication unit 301, a notification information generation unit 302, a user information database 305, and a notification unit 306.

The communication unit 301 communicates with the vehicle 20, acquires the log information stored in the storage unit 211 of the vehicle 20, and outputs the log information to the notification information generation unit 302.

The notification information generation unit 302 generates notification information according to the determination result of the vehicle performance based on the log information or the like acquired from the vehicle 20. The notification information generation unit 302 determines whether predetermined performance is maintained on the basis of the log information or the like acquired from vehicle 20. When the notification information generation unit 302 determines that the predetermined performance cannot be maintained due to occurrence of abnormality, the occurrence frequency of the abnormality, or the like, the notification information generation unit 302 generates notification information for notifying the administrator or the like of the vehicle to that effect and outputs the notification information to the notification unit 306. Note that the administrator includes the owner of the vehicle, a manager, a management company, and the like in a case where the vehicle is shared.

The user information database 305 stores user information regarding an administrator or the like for each vehicle, for example, information indicating a name, an address, a contact address, or the like of the administrator or the like.

The notification unit 306 acquires information regarding the administrator or the like of the vehicle 20 whose performance has been determined by the notification information generation unit 302 from the user information database 305, and notifies the contact indicated by the acquired user information of the notification information generated by the notification information generation unit 302. For example, the notification unit 306 performs processing for transmitting an e-mail or giving an audio notification indicating occurrence of focus abnormality or the like to the administrator of the vehicle 20. When the log information includes information indicating a contact address of the administrator or the like, the notification unit 306 may use the contact address indicated by the log information.

Figure 17:
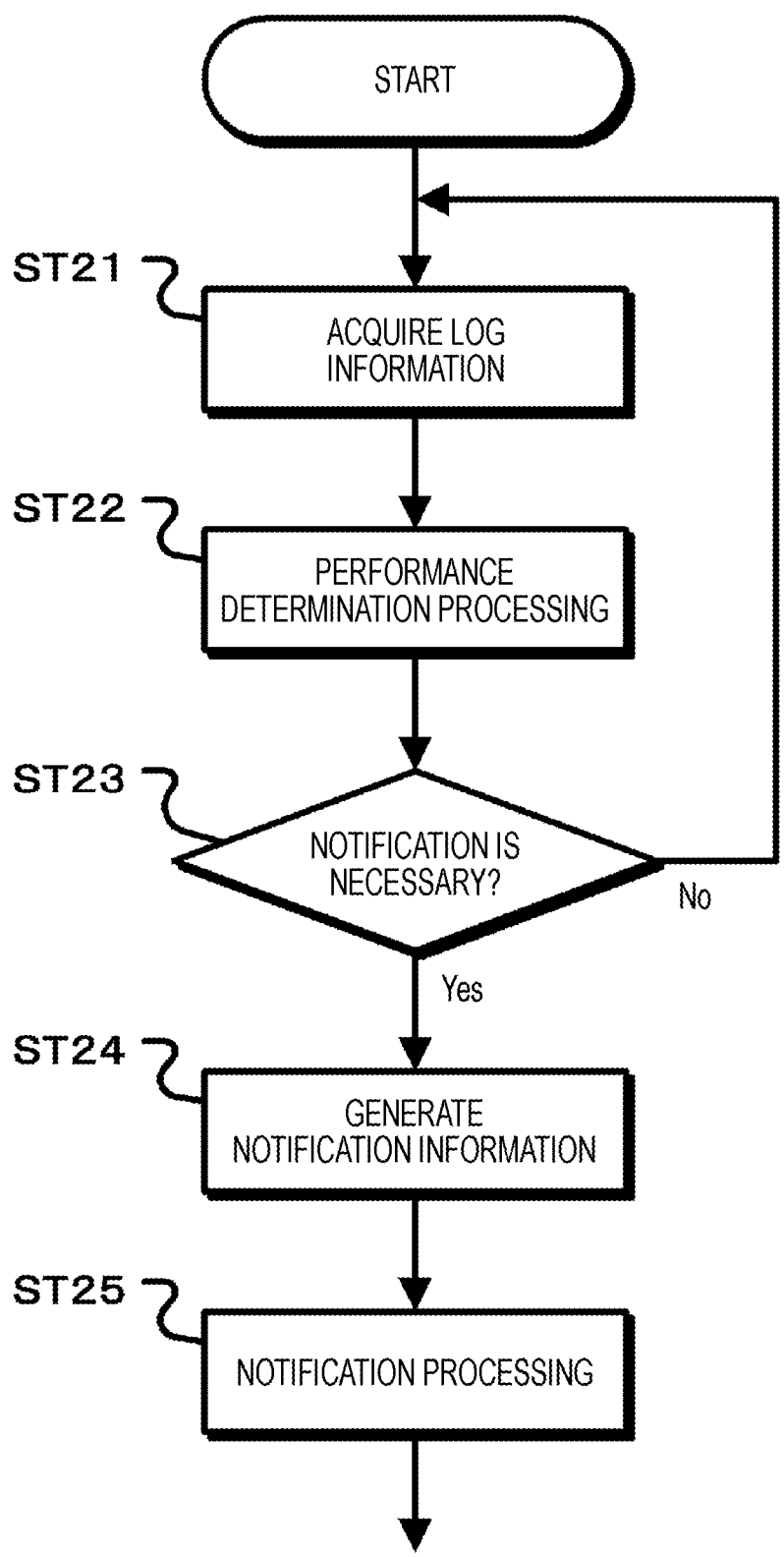
FIG. 17 is a flowchart illustrating an operation of the server.

FIG. 17 is a flowchart illustrating an operation of the server. In step ST21, the server acquires log information. The communication unit 301 of the server 30 communicates with the vehicle 20 to acquire information generated by the vehicle 20, and proceeds to step ST22. Note that in the acquisition of the log information, for example, the server 30 may request the log information to the vehicle 20 every time a predetermined period elapses, or the server 30 may acquire the log information provided from the vehicle 20 every time the predetermined period elapses or when an abnormality occurs.

In step ST22, the server performs performance determination processing. The notification information generation unit 302 of the server 30 determines the performance of the vehicle 20 on the basis of the log information acquired from the vehicle 20 and proceeds to step ST23.

In step ST23, the server determines whether notification is necessary. The notification information generation unit 302 of the server 30 determines whether notification to the administrator or the like of the vehicle is necessary on the basis of the performance determination result of step ST22. When the notification information generation unit 302 determines that the predetermined performance is maintained in the vehicle 20, the notification information generation unit 302 determines that notification is not necessary and returns to step ST21. Alternatively, when the notification information generation unit 302 determines that the predetermined performance cannot be maintained in the vehicle 20, the notification information generation unit 302 determines that notification is necessary and proceeds to step ST24.

In step ST24, the server generates notification information. The notification information generation unit 302 of the server 30 generates notification information to give notification that predetermined performance cannot be maintained or to give notification of an abnormal part, or the like, and proceeds to step ST25.

In step ST25, the server performs notification processing. The notification unit 306 of the server 30 performs processing of notifying the administrator or the like of the vehicle that has acquired the log information in step ST21 of the notification information generated in step ST24.

In this way, if the administrator or the like of the vehicle 20 is notified of the performance determination result, when focus abnormality or the like occurs, not only the occupant of the vehicle 20 but also the administrator or the like of the vehicle 20 can grasp the abnormality. Hence, it is possible to reliably take measures against the occurrence of the abnormality. Additionally, by using the server 30 in a manufacturer, a service center, or the like of the vehicle 20, it is easy to grasp the vehicle situation, and it is also possible to quickly provide an appropriate service.

<15. Other Configuration and Operation of Server>

Figure 18:
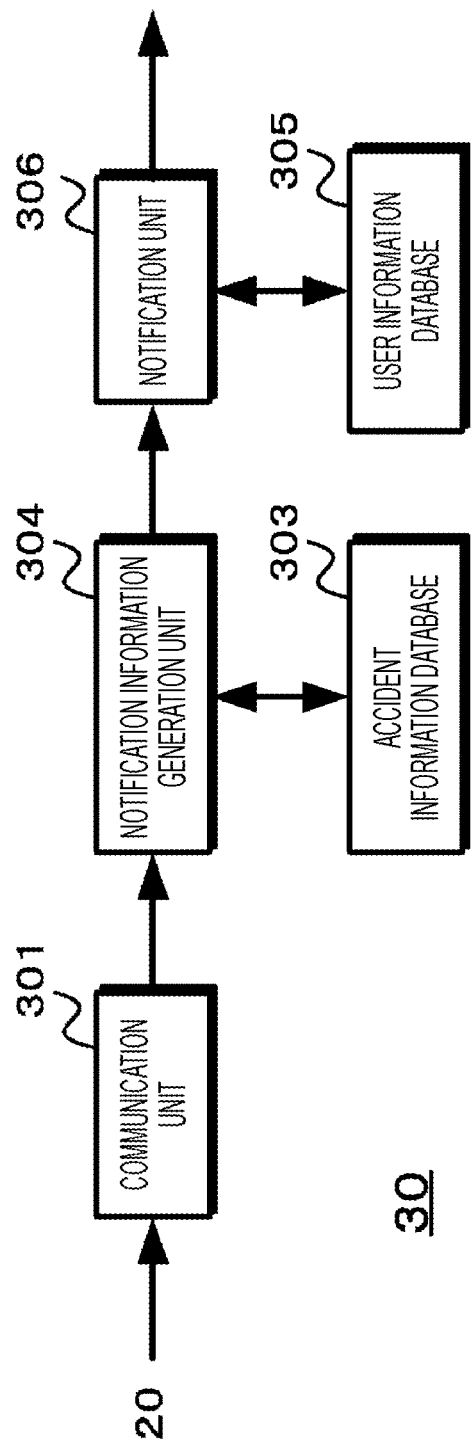
FIG. 18 is a diagram illustrating another configuration of the server.

Next, another configuration and operation of the server will be described, for example, in a case where the server is used in an insurance company that makes an insurance contract for a vehicle. FIG. 18 illustrates another configuration of the server. A server 30 includes a communication unit 301, an accident information database 303, a notification information generation unit 304, a user information database 305, and a notification unit 306.

The communication unit 301 communicates with the vehicle 20, acquires log information stored in the storage unit 211 of the vehicle 20, and outputs the log information to the notification information generation unit 304.

The accident information database 303 stores, as accident information, the type of accident vehicle, the occurrence state of abnormality in the accident vehicle, the accident occurrence rate, accident type, damage situation, and the like for each type of accident vehicle and abnormality that has occurred, for example.

The notification information generation unit 304 calculates the insurance premium of the vehicle 20 from which the log information is acquired on the basis of the log information acquired from the vehicle 20 and the accident information stored in the accident information database 303. The notification information generation unit 304 generates notification information indicating the calculated insurance premium and outputs the notification information to the notification unit 306. For example, the notification information generation unit 304 calculates the insurance premium using at least one of an accident occurrence rate, an accident type, a damage situation, and the like in a case where focus abnormality occurs, the duration of the state in which the focus abnormality occurs, the degree of the abnormality, or the like. The notification information generation unit 304 reduces the insurance premium, for example, in a case where no focus abnormality occurs or in a case where occurrence of the abnormality is dealt with quickly and the duration of the abnormal state is short. Additionally, the notification information generation unit 304 may increase the insurance premium, for example, in a case where a state where an abnormality has occurred is left for a long period of time, in a case where an accident occurrence rate when a focus abnormality occurs is high, in a case where there are many serious accidents, or the like.

The user information database 305 stores user information regarding a contractor or the like who has made an insurance contract for each vehicle, such as information indicating a name, an address, a contact address, or the like of the contractor.

The notification unit 306 acquires, from the user information database 305, information regarding the insurance contractor of the vehicle 20 for which the insurance premium has been calculated by the notification information generation unit 304, and notifies the contact indicated by the acquired user information of the notification information. For example, the notification unit 306 performs processing for transmitting an e-mail or giving an audio notification indicating that the insurance premium is changed due to occurrence of the focus abnormality, or the like, to the insurance contractor.

Note that the calculation of the insurance premium and the notification of the insurance premium may be performed, for example, at a timing a predetermined period before the expiration of the insurance contract. In a case where an event in which the insurance premium cannot be reduced (or an event in which the insurance premium increases) on the basis of the log information occurs, the notification of the insurance premium may be promptly performed.

Figure 19:
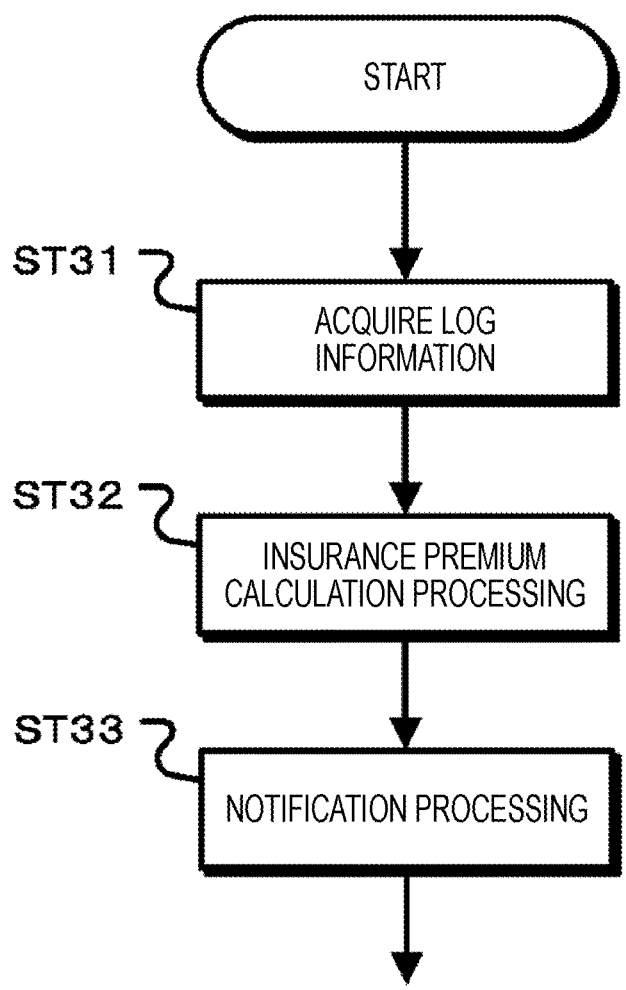
FIG. 19 is a flowchart illustrating another operation of the server.

FIG. 19 is a flowchart illustrating another operation of the server. In step ST31, the server acquires log information. The communication unit 301 of the server 30 communicates with the vehicle 20 to acquire information generated by the vehicle 20, and proceeds to step ST32. Note that in the acquisition of the log information, for example, the server 30 may request the log information to the vehicle 20 every time a predetermined period elapses, or the server 30 may acquire the log information provided from the vehicle 20 every time the predetermined period elapses or when an abnormality occurs.

In step ST32, the server performs insurance premium calculation processing. The notification information generation unit 304 of the server 30 calculates the insurance premium as described above on the basis of the log information acquired from the vehicle 20 and the accident information stored in the database, and proceeds to step ST33.

In step ST33, the server performs notification processing. The notification unit 306 of the server 30 performs processing of notifying the administrator or the like of the vehicle that has acquired the log information in step ST31 of the insurance premium calculated in step ST32.

In this manner, if the contractor or the like who has made an insurance contract with the vehicle 20 as the contracted vehicle is notified of the insurance premium calculation result, the contractor or the like is notified of the insurance premium in a case where a focus abnormality occurs. Hence, it is possible to quickly take measures against the occurrence of the abnormality so that the insurance premium does not increase.

Incidentally, the server 30 may use the log information accumulated in the information database to generate the autonomous driving level control information used by the autonomous driving controller 213, and the threshold (sharpness threshold or vignetting determination threshold) used by the detection unit 221 of the autonomous driving controller 213 or the abnormality detection unit 69 of the imaging device 60f (60sb).

Figure 20:
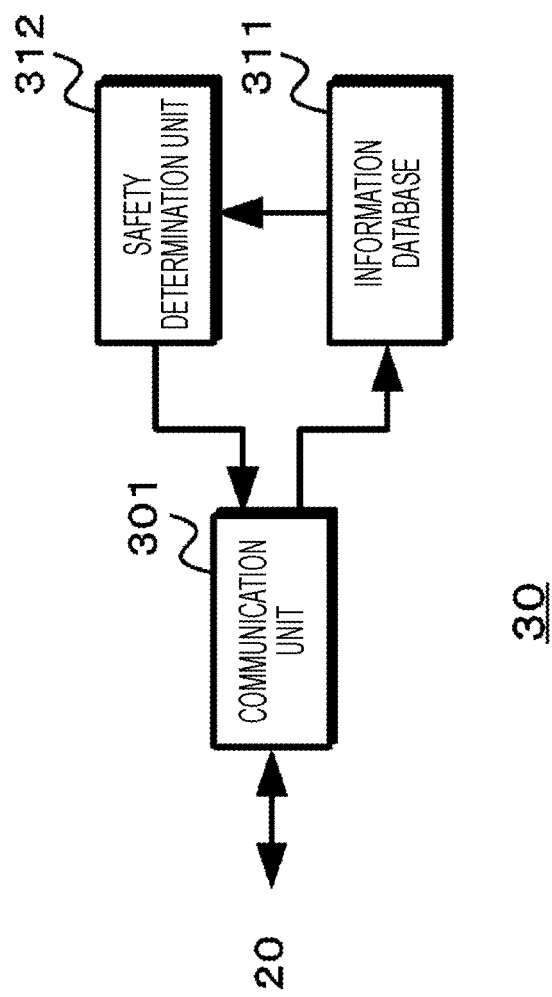
FIG. 20 is a diagram illustrating another partial configuration of the server.

FIG. 20 illustrates another partial configuration of the server. As described above, the communication unit 301 communicates with the vehicle 20 and acquires log information (which may include accident information) from the vehicle. Note that the communication unit 301 may acquire accident information or the like from an external database (e.g., database of insurance company or the like).

Additionally, the communication unit 301 transmits autonomous driving level control information to be described later and an appropriate threshold (sharpness threshold or vignetting determination threshold) to each vehicle.

An information database 311 stores information of each vehicle, such as the type of vehicle, an initial registration year of the vehicle, the type of an in-vehicle camera (for each model), the number of years of use of the in-vehicle camera, a threshold (sharpness threshold or vignetting determination threshold), presence or absence of an accident, and information of each accident vehicle, such as an occurrence state of an abnormality in an accident vehicle, the type of accident vehicle, an accident occurrence rate, an accident type, a damage situation, and the like for each abnormality that has occurred, for example.

A safety determination unit 312 determines the safety of the threshold on the basis of the information of the information stored in the information database 311. For example, it is determined whether a threshold (sharpness threshold or vignetting determination threshold) set by statistically processing information regarding a vehicle that has not caused an accident, information regarding a vehicle that has caused an accident, and accident information is appropriate in terms of safety.

When the safety determination unit 312 determines that the safety is not sufficient, the safety determination unit 312 generates instruction information (including instruction information not permitting autonomous driving function (/ADAS function)) for lowering the autonomous driving level permitted in the vehicle as autonomous driving level control information, and transmits the instruction information to the vehicle through the communication unit 301. Additionally, when the safety determination unit 312 determines that the safety is sufficient, the safety determination unit 312 generates autonomous driving permission information as autonomous driving level control information and transmits the autonomous driving permission information to the vehicle through the communication unit 301.

Note that the safety determination unit 312 may calculate an appropriate threshold for each of the vehicle type, the type of the in-vehicle camera, and the number of years of use of the in-vehicle camera, for example, by the statistical processing described above. Additionally, in a case where the calculated appropriate threshold is different from the set current threshold, the safety determination unit 312 transmits the appropriate threshold to each vehicle through the communication unit 301.

Figure 21:
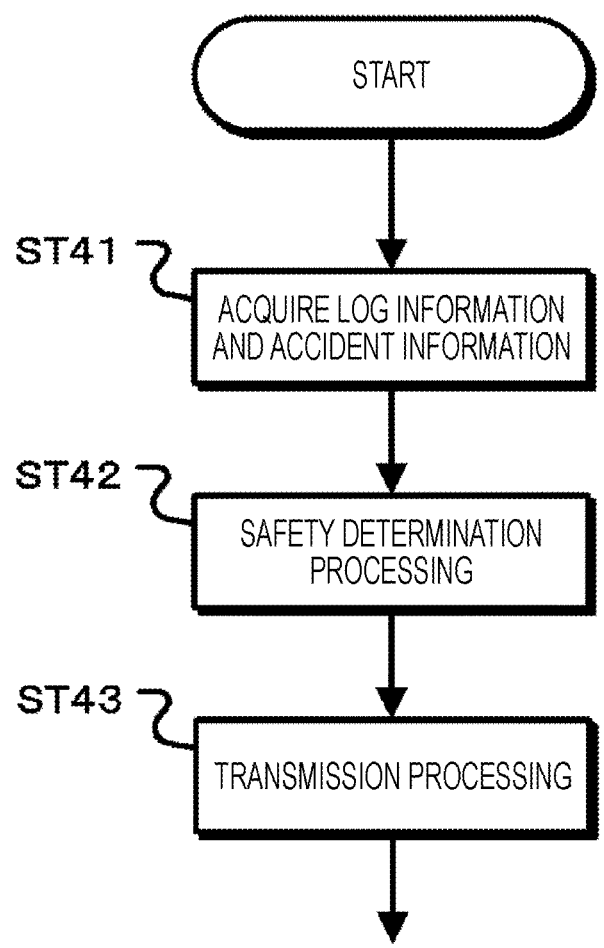
FIG. 21 is a flowchart illustrating another partial operation of the server.

FIG. 21 is a flowchart illustrating another partial operation of the server. In step ST41, the server acquires log information and accident information. The communication unit 301 of the server 30 communicates with the vehicle 20 to acquire log information and accident information generated in the vehicle 20, the information database 311 stores the acquired log information and accident information, and the processing proceeds to step ST42. Note that in the acquisition of the log information, for example, the server 30 may request the log information to the vehicle 20 every time a predetermined period elapses, or the server 30 may acquire the log information provided from the vehicle 20 every time the predetermined period elapses or when an abnormality occurs. Additionally, in the acquisition of the accident information, for example, accident information provided from the vehicle 20 when an accident occurs is acquired by the server 30.

In step ST42, the server performs safety determination processing. The safety determination unit 312 of the server 30 determines the safety of the threshold on the basis of the log information and the accident information stored in the information database 311, generates the autonomous driving level control information according to the determination result, and proceeds to step ST43. For example, when the safety determination unit 312 determines that the set threshold (sharpness threshold or vignetting determination threshold) is not sufficient in terms of safety, the safety determination unit 312 generates the autonomous driving level control information indicating an instruction to lower the autonomous driving level allowed in the vehicle. Additionally, when the safety determination unit 312 determines that the set threshold is sufficient in terms of safety, the safety determination unit 312 generates autonomous driving level control information indicating autonomous driving permission information. Additionally, the safety determination unit 312 calculates an appropriate threshold by the statistical processing as described above, and proceeds to step ST43.

In step ST43, the server performs information transmission processing. The communication unit 301 of the server 30 performs processing of transmitting the autonomous driving level control information generated in step ST42 to the vehicle 20. Additionally, in a case where the safety determination unit 312 determines that the calculated appropriate threshold is different from the currently set threshold, the safety determination unit 312 transmits the calculated appropriate threshold to the vehicle or the imaging device through the communication unit 301.

As described above, since the server 30 transmits the autonomous driving level control information generated on the basis of the log information and the accident information acquired from the vehicle 20 and the calculated appropriate threshold to the vehicle 20 and the imaging devices 60f, 60sb, the vehicle 20 can perform operation control more safely.

2. Application Example

The technology according to the present disclosure can be applied to various fields using an imaging unit. For example, the technology according to the present disclosure may be implemented as a device mounted on not only a vehicle as described above but also a movable body such as a two-wheeled vehicle, a bicycle, a personal mobility, an airplane, a drone, a ship, and a robot. Additionally, the present invention can also be applied to devices used in a production process of a factory, devices used in the construction field, the monitoring field, the medical field, and the like.

The series of processing described in the specification can be performed by hardware, software, or a combined configuration of both. In the case of executing processing by software, a program in which a processing sequence is recorded is installed in a memory of a computer incorporated in dedicated hardware to be executed. Alternatively, the program can be installed and executed on a general-purpose computer capable of executing various types of processing.

For example, the program can be recorded in advance on a hard disk, a solid state drive (SSD), or a read only memory (ROM) as a recording medium. Alternatively, the program can be stored (recorded) temporarily or permanently on a removable recording medium such as a flexible disk, a compact disc read only memory (CD-ROM), a magneto optical (MO) disk, a digital versatile disc (DVD), a Blu-ray disc (BD) (registered trademark), a magnetic disk, or a semiconductor memory card. Such a removable recording medium can be provided as so-called package software.

In addition to installing the program from the removable recording medium to a computer, the program may be transferred from a download site to a computer wirelessly or by wire through a network such as a local area network (LAN) or the Internet. The computer can receive the program transferred in this way and install it on a recording medium such as a built-in hard disk.

Note that the effects described in the specification are merely examples and are not limited, and additional effects not described herein can be obtained. Additionally, the present technology should not be construed as being limited to the embodiments of the technology described above. The embodiments of the technology disclose the present technology in the form of examples, and it is obvious that those skilled in the art can make modifications and substitutions of the embodiments without departing from the gist of the present technology. In other words, the scope of claims should be considered in order to determine the gist of the present technology.

Additionally, the abnormality detection device of the present technology can also have the following configurations.

(1) An abnormality detection device including:
a detection unit that uses an image captured by an image sensor using a lens having an effective image circle smaller than an imaging surface of the image sensor to detect focus abnormality on the basis of a change in a vignetting region of the captured image.

(2) The abnormality detection device according to (1), in which the detection unit determines that the focus abnormality is detected in a case where a change in the vignetting region at the time of focus abnormality detection processing with respect to the vignetting region at a reference time exceeds a vignetting determination threshold.

(3) The abnormality detection device according to (2), in which the detection unit detects a change in a region size of the vignetting region for each of four corners of the captured image, and determines that the focus abnormality is detected in a case where the change exceeds the vignetting determination threshold at any of the four corners.

(4) The abnormality detection device according to (3), in which the detection unit determines a cause of the focus abnormality on the basis of a change in the vignetting region at the time of detection of the focus abnormality.

(5) The abnormality detection device according to any one of (1) to (4), in which the detection unit detects a sharpness of the captured image, and determines that the focus abnormality is detected in a case where the detected sharpness is lower than a preset sharpness threshold.

(6) The abnormality detection device according to any one of (1) to (5) further including
a light source unit that illuminates a subject captured by the image sensor.

(7) The abnormality detection device according to any one of (1) to (6) further including an imaging unit that captures an image using a lens in which the effective image circle is smaller than an imaging surface of the image sensor.

(8) The abnormality detection device according to any one of (1) to (7) further including a motion controller that controls a motion of a vehicle on which the image sensor is mounted, in which
the motion controller stops a driving support function of the vehicle when the focus abnormality is detected by the detection unit.

(9) The abnormality detection device according to any one of (1) to (7) further including a motion controller that executes an autonomous driving control function of a vehicle on which the image sensor is mounted, in which
the motion controller stops the autonomous driving control function and switches to manual driving when the focus abnormality is detected by the detection unit.

(10) The abnormality detection device according to (9), in which the detection unit performs the focus abnormality detection processing before the motion controller starts autonomous driving of the vehicle.

REFERENCE SIGNS LIST

10 Information processing system
20 Vehicle
30 Server
40 Network
60f, 60sb Imaging device
61 Optical system
62 Imaging unit
63 Image processing unit
64 Recognition processing unit
65 Calculation processing unit
66 Second calculation processing unit
67 Information generation unit
68 Drive control unit
69 Abnormality detection unit
70 Output unit
200 Control system
201 Input unit
202 Data acquisition unit
203 Communication unit
204 In-vehicle device
211 Storage unit
212 Communication network
213 Autonomous driving controller
221 Detection unit
222 Self-localization unit
223 Situation analysis unit
224 Planning unit
225 Motion controller
301 Communication unit
302, 304 Notification information generation unit
303 Accident information database
305 User information database
306 Notification unit
311 Information database
312 Safety determination unit
500 Imaging unit
501 Lens
502 Image sensor
502a Imaging surface
503 Lens holder
504 Base part
505 Fixing member
2210 Abnormality detection unit
2211 Signal processing unit
2212 Vignetting amount calculation unit
2213 Fail-safe detection unit
2214 Determination unit

The invention claimed is:

1. An abnormality detection system comprising:
a detection unit that uses an image captured by an image sensor using a lens having an effective image circle smaller than an imaging surface of the image sensor to detect focus abnormality on a basis of a change in a vignetting region of the captured image; and
a motion controller that executes an autonomous driving control function of a vehicle on which the image sensor is mounted, wherein
the motion controller stops the autonomous driving control function and switches to manual driving when the focus abnormality is detected by the detection unit; and
the detection unit performs the focus abnormality detection processing before the motion controller starts autonomous driving of the vehicle.

2. The abnormality detection system according to claim 1, wherein
the detection unit determines that the focus abnormality is detected in a case where a change in the vignetting region at the time of focus abnormality detection processing with respect to the vignetting region at a reference time exceeds a vignetting determination threshold.

3. The abnormality detection system according to claim 2, wherein
the detection unit detects a change in a region size of the vignetting region for each of four corners of the captured image, and determines that the focus abnormality is detected in a case where the change exceeds the vignetting determination threshold at any of the four corners.

4. The abnormality detection system according to claim 3, wherein
the detection unit determines a cause of the focus abnormality on a basis of a change in the vignetting region at the time of detection of the focus abnormality.

5. The abnormality detection system according to claim 1, wherein
the detection unit detects a sharpness of the captured image, and determines that the focus abnormality is detected in a case where the detected sharpness is lower than a preset sharpness threshold.

6. The abnormality detection system according to claim 1 further comprising a light source unit that illuminates a subject captured by the image sensor.

7. The abnormality detection system according to claim 1 further comprising an imaging unit that captures an image using a lens in which the effective image circle is smaller than an imaging surface of the image sensor.

8. The abnormality detection system according to claim 1 further comprising a motion controller that controls a motion of a vehicle on which the image sensor is mounted, wherein
the motion controller stops a driving support function of the vehicle when the focus abnormality is detected by the detection unit.

9. An abnormality detection method comprising
using an image captured by an image sensor using a lens having an effective image circle smaller than an imaging surface of the image sensor to detect focus abnormality on a basis of a change in a vignetting region of the captured image; and
executing an autonomous driving control function of a vehicle on which the image sensor is mounted, comprising:
stopping the autonomous driving control function and switching to manual driving when the focus abnormality is detected; and
performing the focus abnormality detection before the executing the autonomous driving function.

10. A program for causing a computer to execute focus abnormality detection, the program comprising the procedures of
capturing an image by an image sensor using a lens having an effective image circle smaller than an imaging surface of the image sensor,
detecting focus abnormality on a basis of a vignetting region of the captured image; and
executing an autonomous driving control function of a vehicle on which the image sensor is mounted, comprising:
stopping the autonomous driving control function and switching to manual driving when the focus abnormality is detected; and
performing the focus abnormality detection before the executing the autonomous driving function.

11. An information processing system comprising
an abnormality detection device and
a server using a detection result of the abnormality detection device, wherein
the abnormality detection device includes
a detection unit that uses an image captured by an image sensor using a lens having an effective image circle smaller than an imaging surface of the image sensor to detect focus abnormality on a basis of a change in a vignetting region of the captured image, and
the server includes
a notification information generation unit that generates user notification information using a focus abnormality detection result of the detection unit; and
a safety determination unit that generates autonomous driving level control information and a threshold for detecting the focus abnormality by the detection unit by using log information including a focus abnormality detection result of the detection unit.

12. The information processing system according to claim 11, wherein
the notification information generation unit generates, as the user notification information, performance information for presenting performance of the device determined using the focus abnormality detection result to an administrator of a device on which the image sensor is mounted.

13. The information processing system according to claim 11, wherein
the notification information generation unit generates, as the user notification information, information for presenting an insurance premium calculated using the focus abnormality detection result to an administrator of a vehicle on which the image sensor is mounted.

* * * * *